United States Patent

[11] 3,599,186

[72] Inventors Frederick T. May;
Thomas H. Williams, both of Lexington, Ky.
[21] Appl. No. 37,324
[22] Filed May 14, 1970
[45] Patented Aug. 10, 1971
[73] Assignee International Business Machines Corporation
Armonk, N.Y.
Continuation of application Ser. No. 668,599, Sept. 18, 1967.

[54] MEMORY-CENTERED COMPUTER SYSTEM

5 Claims, 28 Drawing Figs.

[52] U.S. Cl. .......... 340/172.5
[51] Int. Cl. .......... G06f 9/16
[50] Field of Search .......... 340/172.5

[56] References Cited
OTHER REFERENCES
IBM 7080 Reference Manual-A22-6560-1 (1961) Pages 30—35

*Primary Examiner*—Gareth D. Shaw
*Assistant Examiner*—Harvey E. Springborn
*Attorneys*—Hanifin and Jancin and D. Kendall Cooper

ABSTRACT: The invention concerns a computer system with the usual input and output devices, arithmetic facilities, clocking facilities, associated control logic and incorporating memory facilities, such as a core memory, arranged in a centralized manner with respect to the other facilities of the system, and having uniquely arranged instruction and data accessing control circuitry for establishing a more efficient utilization of hardware. Basically, the core memory is arranged in a conventional manner as far as reading, writing, and transferring of data is concerned, but beyond this, has particular addressable areas designated Special Addresses for facilitating the processing of both instructions and data with a minimum amount of external hardware. The system operates with only a single address register for accessing both instruction and operand information. In a usual case, an operand is accessed and placed in the special address section of memory by using the addressing facilities. Thereafter, another operand is accessed and the operation required is performed with one operand in the special address section accessed by implied addressing, rather than accessing by the conventional addressing facilities. The foregoing arrangement requires a somewhat longer processing interval, but permits the satisfactory accomplishment of all processing required by the use of a unitary essentially single addressing facility.

The system is considered to be memory-centered since the memory is involved in practically all of the operations performed in the system. Thus, for example, the memory is used in storage of data and instructions, contains index registers and input/output data address, input/output length counts, editing formats, command key conditions, and various special words required during processing of information.

The system operates according to predetermined clocking intervals during which the accessing of instructions, data, input/output transfers, etc. are performed, and in connection with the memory-centered aspect of the system, the clocking circuits are arranged for permutation in order that only a single operand or a pair of operands may be accessed, as circumstances may require.

The system incorporates various counting means associated with the aforementioned primary addressing facilities to control the reading and writing of information both directly, sequentially, and sequentially within a selected block of information. The latter is particularly advantageous in operations requiring a repetitive accessing of selected areas of memory, such as during certain arithmetic operations, recomplementing, Multiply operations, and so on.

INVENTORS
FREDERICK T. MAY
THOMAS H. WILLIAMS
BY D. Kendall Cooper
ATTORNEY

SS INSTRUCTION ACCESSING

SI, RX, IO INSTRUCTION ACCESSING

MEMORY LOGIC

CONTROL TRIGGERS

CONTROL TRIGGERS

MEMORY-CENTERED COMPUTER SYSTEM

The present case is a streamlined continuation of the original Pat. application Ser. No. 668,599, filed Sept. 18, 1967.

Cross-Reference to Related Patent

The following patent is of interest:

U.S. Pat. No. 3,417,379 entitled "Clocking Circuits for Memory Accessing and Control of Data Processing Apparatus," with R. S. Heard and L. M. Hornung, as inventors, filed Nov. 15, 1966, and assigned to the same assignee as the present case.

OTHER REFERENCE

IBM manual Form No. A26–5847, System 360 Model 20, entitled "Principles of Operation."

BRIEF BACKGROUND OF INVENTION

1. Field

The field of the invention encompasses a wide variety of data processing and computing apparatus, particularly apparatus having some form of storage or memory facility for holding instructions and data during processing operations. The invention particularly relates to the memory accessing, clocking circuits, and arrangements for manipulating instructions and data to perform required operations. In this connection, the invention also relates to memory organizational and accessing capabilities of such systems. Reference is made to the patent and the manual previously noted that describe systems of the general type alluded to.

2. Description of the Prior Art

Generally, prior data processing and computing systems having memory facilities have incorporated at least two addressing means in order to be able to handle operations involving more than one operand. These systems have included separate addressing capabilities and are thereby characterized by the duplication of such capabilities and a proportionately greater amount of hardware to perform the normally encountered operations. Prior systems, in some cases, have included specially addressed areas of memory, but only in a somewhat restricted sense, and for specialized kinds of information, such as arithmetic tables, decoding or translation tables, or the like.

In many cases, prior systems have incorporated numerous auxiliary registers, such as latch registers, that serve as index registers or channel registers in the system operations. Such registers naturally involve additional extensive hardware and are a significant factor in the system configuration. In typical prior art systems, accessing of smaller portions of a selected block of information in memory, has usually involved an undue amount of manipulation of significant memory addresses, such as the starting address of the block. When this kind of operation has been performed, the starting address usually must be transferred to some separate register. Then the memory addressing register is cycled in order to access the portions of the selected block in a sequential manner. Subsequently, the initial or starting address is again accessed and set into the memory address register if continued accessing of the same block is required.

SUMMARY

In accordance with the present invention, a computer system is provided with input and output devices, clocking circuits, control logic, a centralized core memory having a plurality of predefined special address locations for storing an Instruction Address Word, an "A" Word, a "B" Word, a number of index register locations, and a number of channel register locations, together with associated addressing facilities for accessing normally unassigned locations in the memory as well as the special locations. Memory locations may be accessed under control of a Storage Address counter (STAC), and decode network, the STAC further having an associated Digit counter and Utility counter. In order to access any block of information in the memory, the starting address of a block is entered in the Storage Address counter and interpreted by the decode network. If a sequential accessing of portions of the selected block are desired, the Digit counter is cycled and superimposed on the STAC decode network for this purpose. The Utility counter is used under various circumstances such as during Command Key operations and "Move" operations that involve the transfer of data from one location in memory to another.

The system also includes logic for accessing memory locations automatically according to implied predefined routines and without using the Storage Address counter. Thus, one operand may be addressed by the implied logic and another by the Storage Address counter. A savings in external hardware is realized.

The implied logic circuitry for addressing memory, particularly the Instruction Address Word (IAW) location, the A Word location, and the B Word location, combines with the Storage Address counter and decode network in a unique manner to provide a broad range of instruction and data processing capability with a minimum amount of hardware. As an example, in an operation involving the addressing of two operands, the instruction previously defined in the program is accessed in the normal sequence of events under control of the Instruction Address Word contents. The instruction is brought from the general area of memory where it was previously stored under control of the address in the Storage Address counter and entered in the A Word. Concurrently, an index (base) register set forth in the instruction is selected to develop the address of one of the operands which is then loaded in the Storage Address counter. Thereafter, the operand is accessed and moved into the B Word in memory. The A Word, which has the instruction in it, is accessed in order to select the appropriate index register for development of an address of the other operand required. This address is then generated and entered into the Storage Address counter. The operation then continues with the two operands, one of them now stored in the B Word and accessed by implied predefined addressing and the other one accessed from some other location in memory under control of the Storage Address counter. An operation involving only a single operand is pursued in a similar manner.

OBJECTS

An important object of the present invention is to provide a computing system with a broad range of data processing capabilities accomplished with a minimum amount of hardware.

Another object of the invention is to provide a computing system that is memory-centered and organized in such a manner that practically all instruction and data processing activities involve the accessing of memory thereby minimizing the requirement for extensive amounts of external hardware.

A particular object of the present invention is to provide a computer system having a central memory facility with both direct and sequential accessing of information, or combinations thereof, performed in an efficient manner.

Still another object of the invention is to provide a computing system having a central memory facility organized with predefined special register locations that are readily accessible through internal logic as well as conventional addressing facilities and that are available on a temporary or semipermanent basis for storing various kinds of information, including instruction words, data words, index register locations, and information locations associated with input/output devices.

A further object of the invention is to provide a computing system with an optimized hardware configuration wherein operations normally requiring duplication of hardware are performed instead by techniques that involve the repetitive or time sharing utilization of certain basic logic and circuitry.

The foregoing and other objects, features, and advantages of the invention will be apparent from the following more particular description of the preferred embodiment of the invention as illustrated in the accompanying drawings.

DESCRIPTION OF THE DRAWINGS

In the drawings:

FIG. 13—Access Time, SS Instruction Format

FIG. 14—Access Time, RX, IO, SI Instruction Format

FIG. 15—Access Time, Branch and Reset Condition

FIG. 16—Access Time, Branch and Store

FIG. 17—Subtract, Compare, Add, Transfer

FIG. 18—Pack

TERMINOLOGY

The following terminology is sued in the present case and is presented for reference in the discussion that follows:

I.—GENERAL

A Register—A 4-bit latch register used with the S Register for arithmetic operations and I/O data transfer.

A Word—Used as an auxiliary word in performing certain instructions.

Accumulator—Accumulates the binary (or decimal) sum (or difference) of the contents of the A Register and S Register. The output of the accumulator simply gives the logic result of the inputs as long as they are present. It does not latch and hold the result.

AN—A control block for writing data back to Memory from the A Register.

Alpha ($\alpha$) N—A control block for writing P time data from the Accumulator into Memory.

A—Logical And circuit. Supplies output when all inputs are satisfied.

And-Invert (AI)—A basic circuit that supplies a 0 output when all inputs are at a 1 level for the And Invert function. If any of the inputs is at a 0 level, the output is a logical 1, and the circuit performs the Negative OR invert function. When only a single input and a single output are utilized, the output will always be the inverse of the input, and the circuit acts as an Inverter.

And-Or-Invert (AOI)—An And-Or-Invert (AOI) circuit having a plurality of OR leg inputs, each leg having a number of And inputs.

Arithmetic Operation Instruction—An instruction that directs the system to perform an Add, Subtract, Compare, or Transfer operation with a P word and Q word whose addresses are contained in the Instruction.

ATTN X—I/O Device attention latches. X represents the device number.

B Word—Used as an auxiliary word in performing certain instructions.

Branch Instruction—An instruction that enables the changing of sequences of program steps depending upon the High-Low-Equal or overflow latches, or unconditionally.

Byte—8-bit unit of data. Coded combination within a byte can represent numeric, alphabetic, instruction, or special-purpose data. The internal 8-bit character code is EBCDIC.

Carry—Stores the arithmetic carry from the high order bit position of the Accumulator.

Channel Registers—Twelve one-word registers numbered 4 through F that are used in conjunction with 12 channels to I/O devices. Each register uses 2 bytes to store the address to be accessed by its associated I/O device. This address is advanced by the I/O Overlap Adapter, which acts as the channel attachment for the CPU, as data is transferred through the channel. A length count is stored in one byte of the channel register and it is reduced in value as data is transferred through the channel. The remaining byte can be used for special purposes such as temporary storage of a cyclic check in File read/record operations.

Figure 2:
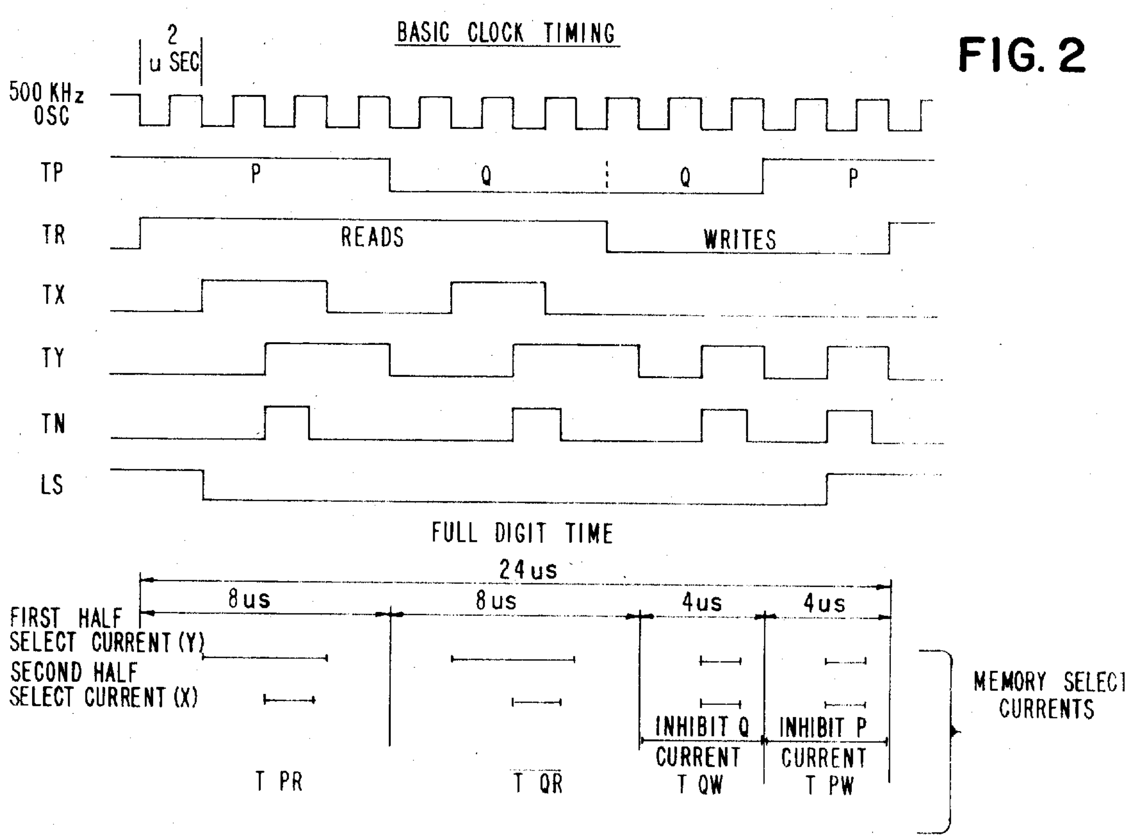
FIG. 2 is a clock timing diagram illustrating the pulse sequencing developed for accessing memory and making logical decisions while operating with two operands P and Q.
Figure 3:
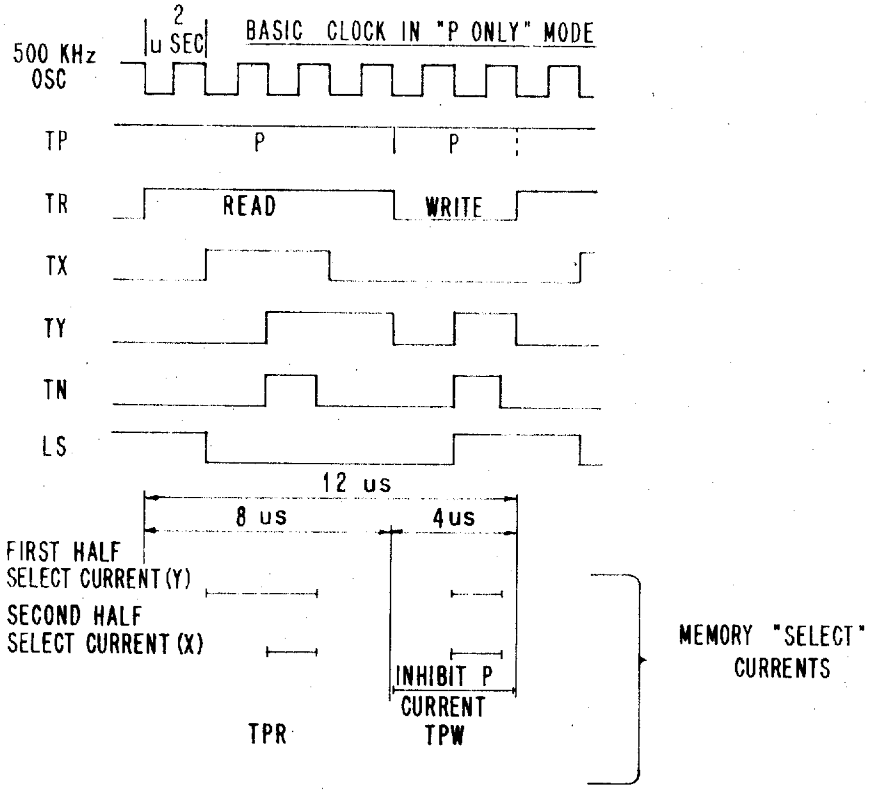
FIG. 3 is a clock timing diagram that is similar to FIG. 2 with the exception that it involves only a single operand P.

Clock—A 4-trigger counter driven by an oscillator to provide the basic machine timing. It is primarily built for the storage cycle. Refer to FIGS. 2 and 3.

Command Key Conditions—Stores 16 conditions that can be set or reset manually or that can be reset by the program. The "one bit" of each digit stores the condition.

Control Logic—Controls the data flow according to the desired operation specified by the Op Register and maintains the following logical sequence of instruction access and execution.

Instruction Access—During this time, the instruction is read from core storage and the operands are prepared for the execute phase. The actual timing involved in the access is a function of the instruction format.

Instruction Execute—During this time, the instruction is performed on the data as prepared in access time. At the end of this time, the next instruction access occurs on the next sequential instruction.

Core Storage—Core storage uses magnetic cores for the storage of data, instructions, index registers, I/O data addresses, I/O length counts, edit formats, the instruction address, command key conditions, and special words for processing. Storage is accessed 4 bits in parallel with a storage cycle time of 12 μsec. The clock cycle, shown in Figure 2, is organized with two "reads" followed by two "writes." This organization allows for two-address operations, especially those requiring the use of the accumulator. In a number of operations, only the first "read" and second "write" times are cycled.

Digit Counter—A 5-bit trigger counter for digit selection in accessing instructions and performing operations. The counter can count in either direction. Triggers sometimes are referred to as "T's."

Direct—Implies that Instruction has direct address signals for P and Q words.

DIV—A logic term generated to indicate that the operation code for Divide is in the N Register during the execution phase of an instruction.

Double Word—8 bytes.

EDAC—A logic term generated to indicate that the operation code for Edit or Unpack is in the N Register during the execution phase of an instruction.

Edit Control—The Edit Control is divided into Set Address and Set Data. During Set Address, the contents of the Instruction Address Word may be edited. During Set Data, the contents of the byte which is addressed by the Instruction Address Word can be modified.

High-Low-Equal and Overflow Latches—A set of latches (I0, I1, I2, I3) that are used primarily to indicate the result of comparison of two words primarily by subtraction. The status of the latches is checked to determine whether a Branch operation is required. They may be set under other circumstances, such as I/O operations, testing of individual bits, overflow, or other arithmetic operations.

I—Logical invert circuit. Output is inverse of input.

IA—Access Time. That portion of the machine sequence in which the instruction is accessed and prepared for the execution phase.

IE—Execute time. The portion of the machine sequence in which an instruction is executed in accordance with the operation code.

I0, I1, I2, I3—Latches that store the High, Low, Equal, Overflow conditions, respectively.

I/O Overlap Adapter and Interrupt—An I/O Overlap Adapter is available. It can perform a Transfer I/O operation with the 10-key entry, the command keys, the primary printer, or, as an option, the alpha keyboard entry. All of these controls are direct, meaning that the CPU is not processing while the transfer occurs. I/O overlap is necessary to control any other I/O devices. Also, the primary printer can be overlaped. An I/O device is classified as "Incremental" or "Burst."

An "Incremental" device must be able to "latch up" on any character. Feedback from the device indicates when it can transmit or receive data. If service to the CPU is not available during the period, the device must "lock-up" and wait until service is provided. A "Burst" device does not have the ability to "latch-up" on any character. Therefore, once a transfer is initiated, the data flow occurs at the speed of the device and all other CPU and incremental I/O operations wait. All operations resume where they were suspended after the burst operation is complete. The CPU allows an interrupt to service an Incremental device at the end of any instruction, while a manual instruction is being performed, or while a Transfer or Control I/O instruction is waiting on its device to complete a previous operation.

Index Registers—Eight binary registers numbered 8 through 15. They store data to be used for effective-address generation when specified in the address position of an instruction. Up to 15 binary bits code the value of the data. The sign is stored as the 16th bit with 0 for plus and 1 for minus. Negative numbers are stored in 2's complement form. The registers can be modified with the binary RX instructions.

Indirect (P and/or Q)—Indicates that a memory location addressed by an instruction contains the actual address of an operand, either the P word or the Q word.

Inhibit Control—Controls writing of ones and zeros in core storage. Writing can store the state of either the A Register, S Register, or the Accumulator output.

Instruction Address Word (IAW)—Stores the address of the instruction being used by the CPU and is updated prior to the access of each instruction. Any successful branch instruction modifies this word to accomplish the branch.

Figure 5:
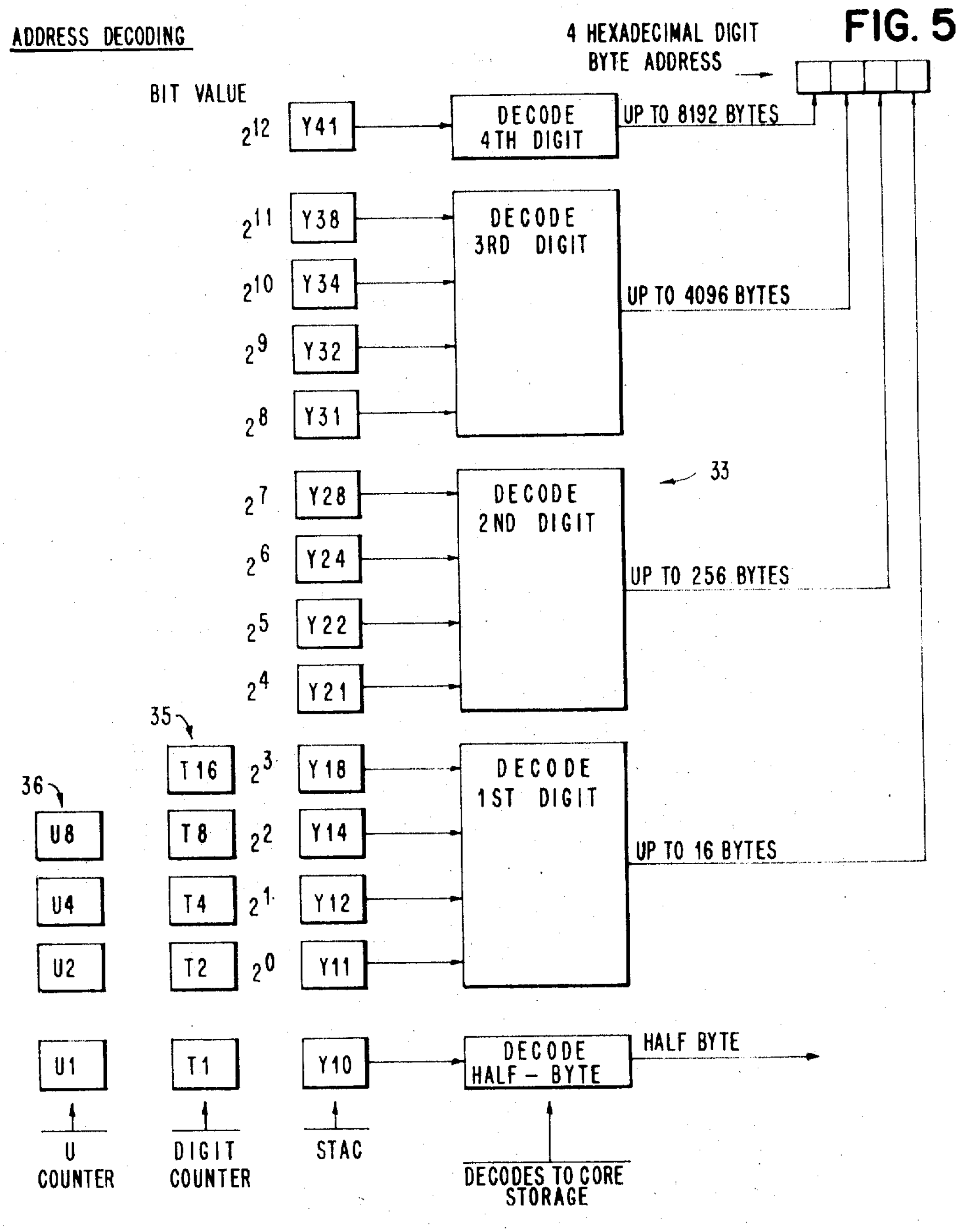
FIG. 5 illustrates a number of memory addressing facilities including the storage address counter, the digit counter, and the utility counter, together with associated decoding networks.

Invert—Implies a logical inversion of a 1 to 0 or a 0 to 1.
Jump—Synonymous with Branch.
LOP—A logic term generated to indicate that the operation code for a Logical Operation is in the N Register during the execution phase of an instruction.
Latch—A bistable storage circuit normally having one state (0) and settable to another state (1) upon application of a signal to its Input. As used herein, the term implies a setting operation of the curcuit and a subsequent feedback from the output of the circuit to latch it into the state to which it has just been set.
Link Sequence—A sequence used during a Branch operation for storing the location of the instruction that has been interrupted and to which the program should return when a Subroutine is completed.
Manual or Man—Manual Entry.
MCB—Move or Compare Byte.
MR—Master Reset. A short time interval which occurs after each IA and after each IE. Used to reset various bistable devices which were used during the previous operations.
N Register (N0, N1, N2, etc.)—A designation that is synonymous with Op code register.
Not—A logical inversion indicated by $(\overline{X})$: $\overline{T2}$, $\overline{T4}$, etc.
Op Register—An 8-bit latch register that stores an Op code while an operation is being performed.
Or (O)—A logical term implying an output from a Logic block when any one of several inputs is satisfied.
P Time—Time interval defined by TP.
P Word—Word addressed by P address field of the instruction. Synonymous with operand 1.
PACK—A logic term generated to indicate that the operation code for Pack is in the N Register during the execution phase of an instruction.
Q Time—Time intervals defined by Not TP.
Q Word—Word addressed by Q address field of instruction. Synonymous with operand 2.
Quad Word—16 bytes.
Read/Write—Reading a core implies detecting whether it has a 1 or 0. Writing the core implies storing a 1 in the core.
Read/Read/Write/Write (RRWW)—Long sequence of Read/Write signals for two address operations.
Read/Write (RW)—Abbreviated sequence for controlling access Memory for single address operations; and other logic.
S—The S Register contains the code for a minus sign.
SBCD—The S Register contains a valid decimal (BCD) code, that is, a binary value less than ten.
SCAT—A logic term generated to indicate that the operation code for Subtract, Compare, Add or Transfer is in the N Register during the execution phase of an instruction.
S Register—A 4-bit latch register that is used for temporary storage of outputs from the S Amps.
Sense Amplifier—Four sense amplifiers are used for reading core storage. This is the only data path out of storage.
Single Word—4 bytes.
Special Addresses—The first 144 bytes of core storage are used for special addresses. They are accessed without the use of the STAC decode so they can be used in conjunction with each other in certain operations. None of these words are addressed specifically by the program; they are simply inferred by the instructions.
STAC—This is a trigger register that can address any half-byte in storage and that can count upward sequentially. The lowest-order 5 bits are not always used for addressing. Both the U counter and the digit counter can supplement the addressing provided by these bits. Addressing by the decode of STAC is shown in Figure 5. Triggers sometimes referred to as "Y's."
TR and Not TR—TR defines Read time and Not TR defines Write time.
Trigger—A bistable storage circuit normally having one state (0) and settable to another state (1) upon application of properly applied input signals. The circuit may be set to state (1) by first conditioning the DC Or gate input and applying a negative-going voltage shift at the corresponding AC input. A similar pair of inputs is also available to reset the device to state (0).
Utility (U) Counter—A 4-trigger counter that can count down in a binary form from 15 to 0. It is sometimes used to address data in core storage as shown in Figure 5. Triggers sometimes referred to as "U's."
Unassigned Words—There are 7 unassigned single words for use in special features that may be added.
Write Control—Controls the writing of information in core memory as determined by the AN, Alpha N, or SN blocks.
Y Register—Synonymous with STAC.
*—Symbol indicating that a term is essentially related to the logic level accompanying the symbol.

EXPLANATION OF LOGIC TERMS

II.—Clock Terminology

TPR—First read time in the read-read write-write cycle.
TQR—Second read time in the cycle.
QW—First write time in the cycle.
TPW—Second write time in the cycle.
PSET—Indicates that the basic clock cycle is to be simply read-write. By forcing the P-Q trigger to the "P" state, TQ time is eliminated. The digit time is 12 microseconds rather than 24 microseconds.
TX—A time which occurs during the middle 4 microseconds of each read time. It is often used to time the setting or resetting of latches.
TY—The last half of the read or write cycle. It is 4 microseconds long in read time and 2 microseconds long in write time.
LS—A time which overlaps the transition from TPW to TPR (i.e., the end of a digit time).
TB—Sample pulse which falls as TY falls.
TDL—Sample pulse which falls as TY falls with LS on (so it occurs at the start of every TPR time).
LSTPR—A generated term defining the first 2 microseconds of TPR time.
TPRTY$\overline{LS}$—A generated term defining the last half of TPR time.
TPWLS—A generated term defining the first half of TPW time.
TXTY—A generated function defining a 2 microsecond time in read time.
TN—A time defined by a single shot gated with clock terms and driven by the oscillator. It is used for selecting memory currents.
TA—Clock signal synonymous with TDL.

III.—Memory Terminology

R/W M—The gating term which selects the proper GMS circuits to address the location specified by the Y's. Thus, it means Read/Write Memory.
R/W R—Addresses the index register specified by the B latches. It means Read/Write Register.
R/W IAW—Read/Write Instruction Address Word. This term selects only this one special location.
R/W A—Read/Write A Word. This is a special location equal in length to a double woed.
R/W B—Read/Write B Word. This special word is a quad word.
R/W CR—Read/Write Channel Register. The channel register to be addressed depends on which I/O device is selected.
R/W IND—Read/Write Indicator Word. The core indicators are stored as the one bits of the digits of this special double word. A particular indicator is selected by setting the U counter to that indicator number and making DWU (digits with the U counter) high.
SN—Write from the S register. When this term is high, the data of the S register is written at TW time into whatever location of memory is addressed.
AN—Write from the A register.
BEN—Write from the Accumulator output.
DWY—Digits with the Y triggers. When this term is high, the digit counter does not select the digits. They are selected by Y10, Y11, and Y12.
DWU—Digits with the U triggers. This term causes digits to be selected according to the state of the utility counter.
DBL—This term is high when the operand being addressed is a double word. It causes the 8 bit of the digit counter to be sampled for proper addressing.
QUAD—This term causes both T8 and T16 (the 8 and 16 bits) to be sampled so that a quad word may be addressed properly.

IV. Terminology

| | |
|---|---|
| T1 | the one bit of the counter |
| T2 | The two bit of the counter |
| T4 | the four bit of the counter |
| T8 | the eight bit of the counter |
| T16 | the 16 bit of the counter |

The digit counter normally counts from zero to seven, or the reverse. T8 will come on only if the term DBL is high. Also, T16 will come on only if QUAD is high.

The digit counter can count either up or down, depending on which gate term (D UP or D DOWN) is high.

If T8 or T16 is on, each will turn itself off at the proper time even if DBL or QUAD are not high. Only the "on" gates depend on DBL and QUAD.

IV.—Digit Counter Terminology

T1—the one bit of the counter
T2—the two bit of the counter
T4—the four bit of the counter
T8—the eight bit of the counter
T16—the sixteen bit of the counter The digit counter normally counts from zero to seven, or the reverse. T8 will come on only if the term DBL is high. Also, T16 will come on only if QUAD is high.

The digit counter can count either up or down, depending on which gate term (D UP or D DOWN) is high.

If T8 or T16 is on, each will turn itself off at the proper time even if DBL or QUAD are not high. Only the "on" gates depend on DBL and QUAD.

D UP—The gate term which selects the logic for counting up.
D DOWN—The gate term for counting down.

The input to the digit counter triggers is TDL. So the counter may change state only at start TPR time. It will change state only if gated. The digit counter is reset at every master reset (MR).

D0, D1—Generated digit times defined by all five T triggers.
D2, D3, D4, D5, D6, D7—Generated digit times defined only by T1, T2, and T4.
TC—A generated function defining the last digit of an operand, depending on DBL, QUAD, or Half word logic.

V. Y Counter Terminology

The Y counter is the Storage Address Counter (STAC). It counts up one-half a byte per count.

Y42, Y41—The 2 and 1 bits of the fourth digit of the address.
Y38, Y34, Y32, Y31—The 8, 4, 2, 1 bits of the third digit of the address.
Y28, Y24, Y22, Y21—The 8, 4, 2, 1 bits of the second digit of the address.
Y18, Y14, Y12, Y11—The 8, 4, 2, 1 bits of the first digit of the address.
Y10—A trigger to specify one-half a byte while address with DWY. When Y10 is on, the digit half of the byte is address. The zone half addressed when Y10 is off.
YUP—The gate term for changing the state of the Y's at the end of TPW.
$\overline{\text{RST Y}}$—The term which resets all the Y triggers to zero (a DC reset).
BE TO Y—The gate term for setting the Y's according to the output of the accumulator. This is the only path for setting the Y's. Note that if the A register is cleared, the BE's are equal to the S register.

Since the Y counter is implemented as a partial ripple counter, half the Y's are DC set, and the others are set by the AC set gate logic.

VI. U Counter Terminology

The U counter is the Utility Counter. It counts down only.

U1—the one bit of the U counter
U2—the two bit of the U counter
U4—the four bit of the U counter
U8—the eight bit of the U counter
U DOWN—The gate term for counting the U counter down. If gated, it changes state at the start of TPR time.
BE TO U—The gate term for transferring the accumulator output to the U's. The logic goes to the AC set gates; it is not a DC set.
$\overline{\text{RST U}}$—The term which resets the U's to all zeros (a DC reset).
U=0, $\overline{\text{U=0}}$, U=1—Generated functions which sample the state of the U's at all times.

VII. Accumulator Terminology

The accumulator configuration is

```
CD enters          A8  A4  A2  A1        (A register)
into the                (±)
logic of the       S8  S4  S2  S1        (S register)
1-bit in the
next digit       AL8  AL4  AL2  AL1
                           +
               Δ   (corrective factor)
               |
(digit carry  CD  BE8  BE4  BE2  BE1    to memory
or borrow)                              with BEN
```

SIX—When this term is high, corrective factors are added to yield only BCD results in the BE's.
NEG—This term causes the accumulator to subtract. The carries (both for bits and for the digit) become borrows.
AL=0, $\overline{\text{AL=0}}$—Generated terms which sample the AL's. These often are used in comparing the data in the A's and S's.
$\overline{\text{INHCDON}}$—This term prevents the digit carry trigger from coming on at the end of the digit even if the sum normally would gate if on. This inhibit term often is used for the sign digit in decimal arithmetic because the signs (1111 or 1101) are non-BCD.

DETAILED DESCRIPTION

System Description

Figure 1:
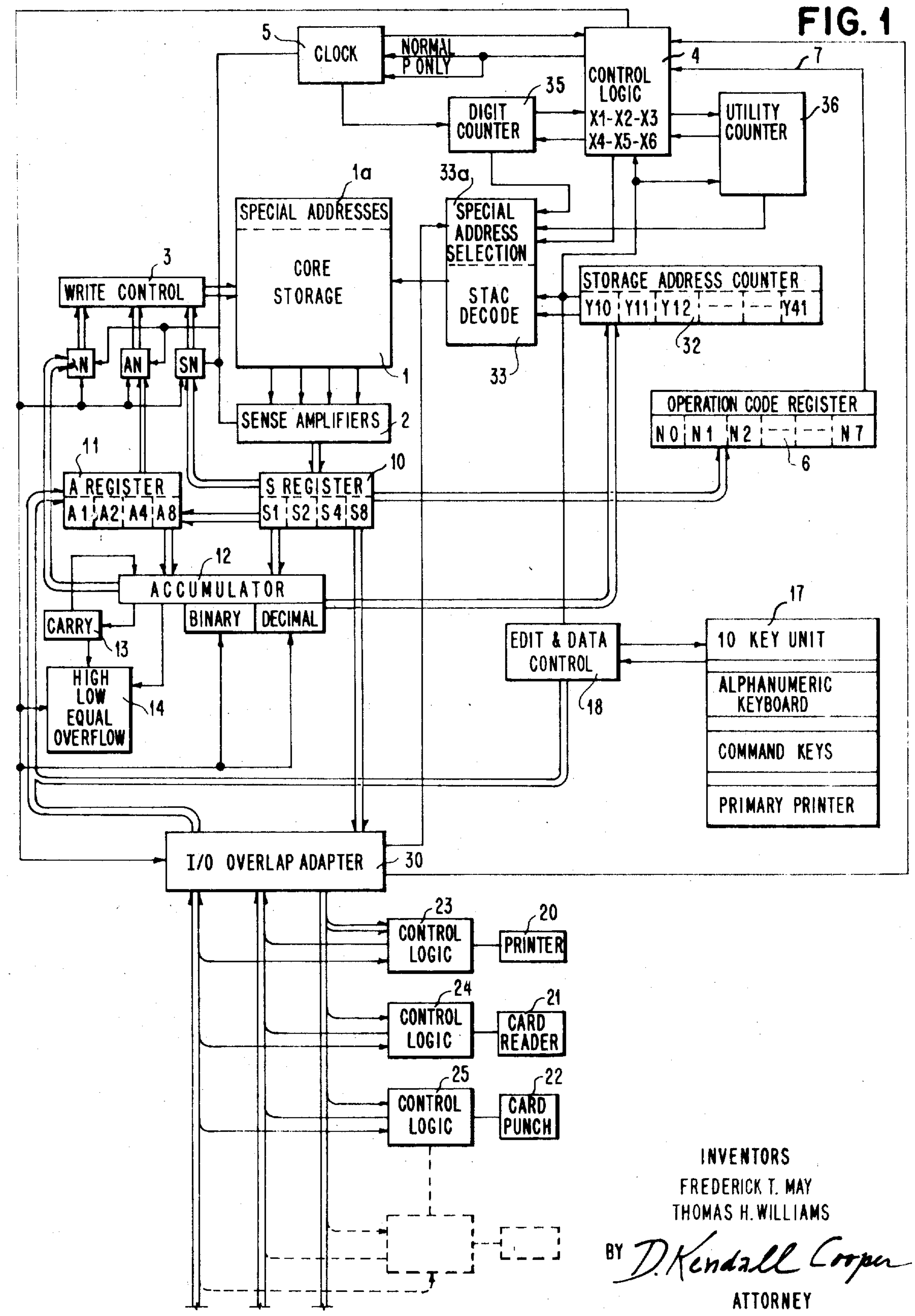
FIG. 1 is a diagram of a computer system having various input and output devices, clocking circuits, control logic; arithmetic facilities, a number of specialized registers, a central core memory facility with a special address section, means associated with the memory for reading and writing information therein, and other means including a storage address counter, a decode network, a digit counter, and a utility counter for performing all of the various accessing operations required in the system.

Reference is made to FIG. 1 which illustrates a proposed system configuration of a data processing and computing apparatus incorporating a number of special features according to the present invention. The system includes a core memory (storage) facility 1 having a special address area 1*a* and having the usual sense amplifier circuits 2 for reading information, and write control circuits 3 for restoring information into the memory 1. All of the operations of the system are controlled by a logic block 4 and according to pulse time sequences established by a clock 5. The system operates according to a stored program that is entered into the system in a conventional manner and stored in memory 1 for accessing in a generally sequential manner. As instructions are accessed, they are interpreted, operation codes stored therein are entered in an operation code register 6 and other portions of the instructions serve to develop addresses of data required in the operation. In some cases, an instruction will contain data for immediate use. The operation code entered in register 6 controls logic 4 by line 7 and eventually controls the accessing of data from memory 1, the accessing of other instructions as appropriate, arithmetic operations, and other miscellaneous kinds of operations. Data flows to and from memory through an S register 10 and an A register 11. Operands in the S register 10 and A register 11 are processed in an arithmetic operation at least, by an accumulator 12 that is operable in either a binary or a decimal mode. Accumulator 12 has an associated Carry trigger 13 and a condition indicating circuit 14 for evidencing high, low, equal, and overflow conditions of data passing through accumulator 12.

The system includes a number of fundamental input/output devices indicated in block 17 as a 10 key unit, an alphanumeric keyboard, command keys and a primary printer. Provision is made for transferring data to and from these devices together with editing capabilities by block 18. Additional input/output devices such as a printer 20, card reader 21, card punch 22, etc. connected through associated control logic 23, 24, and 25 and an input/output (I/O) overlap adapter 30 are available for incorporation in the system, as circumstances may require.

The system includes a single Storage Address counter (STAC) 32 and an associated decode network 33 having a special address selection section 33*a*. The system further includes a Digit counter 35 and a Utility counter 36 that are used in connection with control logic 4 and the decode network 33, particularly the special address selection section 33*a* for controlling the accessing of information in memory 1. Practically all types of operations in the system in FIG. 1 involve the accessing of locations in memory 1 including, under various circumstances, the special address locations to be described in detail subsequently. As evidenced by the system diagram, memory 1 is a dominant part of the system and hardware outside of memory 1 is kept at a minimum. The accessing of information in memory 1 is the primary responsibility of Storage Address counter 32, the only memory address counter provided, and with the special accessing techniques described, the system operates in an unusually efficient manner with a minimum of hardware, and yet with a considerable amount of data processing capability.

It is interesting to note the input/output (I/O) overlap adapter 30 enables the concurrent operation of the input/output devices connected thereto, such as the devices 20—22 concurrently with data processing operations of the system. That is, overlap adapter 30 allows time sharing of the core storage 1 with the central data processing facilities including such elements as accumulator 12 on the one hand, and the various input/output devices, on the other hand.

If desired, the system may be provided with facilities for handling devices that operate on either an incremental or a burst basis.

Clock

Clock circuits 5, FIG. 1, supply pulse sequences in two modes of operation as illustrated in FIGS. 2 and 3. FIG. 2 may be considered a normal clock timing sequence with the development of pulses required for reading and writing each of two operands designated P and Q, respectively. The sequence involves Read P, Read Q, Write Q, and Write P, in that order. Basically, as is conventional, the clock pulses are derived from an oscillator operating according to a predetermined frequency, such as 500 kilohertz (kHz.). The basic oscillator drives the trigger circuits included in the clock circuit block 5, FIG. 1, for deriving pulse sequences designated TP, TR, TX, TY, TN, and LS. The reading and writing of information in memory may be established on any convenient cyclic basis and in the assumed case is shown as 24 microseconds ($\mu s$). The development of half-select currents for X and Y directions in memory 1 is depicted in the lower portion of FIG. 2.

When the operation of the system requires the accessing of only one operand, the clock sequencing is permuted to the pulse sequence shown in FIG. 3 which involves only a Read P and Write P sequence. Examples of such operations are column shift, loading an external register from a memory location, etc. The development of half-select currents for memory I is similar to that shown in FIG. 2.

The timing diagrams of FIGS. 2 and 3 are shown for illustrative purposes only since any convenient timing sequence may be employed in the system of FIG. 1. As an example, it may be desirable to use a timing sequence such as that disclosed in the aforementioned Heard, et al., patent that involves a Read, Read, Write, Write, sequence as one mode, or a Read, Write, Write, sequence as another mode.

Memory with Special Address Section

According to the present inventive arrangements, memory 1, FIG. 1, is organized with a large number of conventionally accessible word locations, and in addition, comprises an invaluable special address portion that is useful under a variety of operating circumstances.

Figure 4:
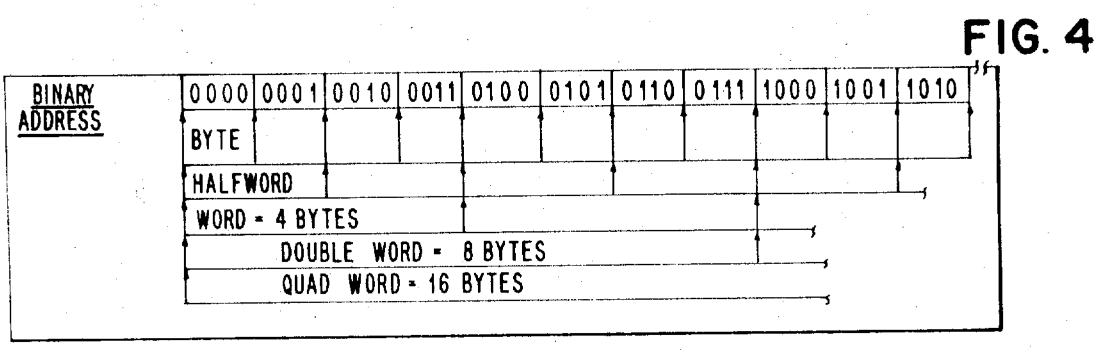
FIG. 4 illustrates a proposed information format for the system of FIG. 1.

Information in memory 1 is arranged in digits, bytes, half words, words, double words, and quad words, as shown in FIG. 4. Information is arranged in the memory in a particular manner, depending upon whether it represents decimal data, binary data, instruction words, or special words. Generally, decimal data may comprise a plurality of addressable locations up to a quad word in size. Binary data is represented by half word portions of memory. Instructions comprise four bytes of information totaling one word. Special words may involve various sizes as indicated in the following table which sets forth a proposed assignment for a number of special words that are useful during operation of the System.

TABLE A

| Address | Decimal equiv. | Word length | Purpose |
|---|---|---|---|
| 000 | 0 | Single | Instruction Address Word. |
| 004 | 4 | do | Unassigned. |
| 008 | 8 | Double | Command Key Conditions. |
| 010 | 16 | Quad | "B" Word (Internal use). |
| 020 | 32 | Single | Index Register No. 8. |
| 024 | 36 | do | Index Register No. 9. |
| 028 | 40 | do | Index Register No. 10 (A). |
| 02C | 44 | do | Index Register No. 11 (B). |
| 030 | 48 | do | Index Register No. 12 (C). |
| 034 | 52 | do | Index Register No. 13 (D). |
| 038 | 56 | do | Index Register No. 14 (E). |
| 03C | 60 | do | Index Register No. 15 (F). |
| 040 | 64 | Double | "A" Word (Internal use). |
| 048 | 72 | Single | Unassigned. |
| 04C | 76 | do | Do. |
| 050 | 80 | do | Channel Register No. 4. |
| 054 | 84 | do | Channel Register No. 5. |
| 058 | 88 | do | Channel Register No. 6. |
| 05C | 92 | do | Channel Register No. 7. |
| 060 | 96 | do | Channel Register No. 8. |
| 064 | 100 | do | Channel Register No. 9. |
| 048 | 104 | do | Channel Register No. 10 (A). |
| 06C | 108 | do | Channel Register No. 11 (B). |
| 070 | 112 | do | Channel Register No. 12 (C). |
| 074 | 116 | do | Channel Register No. 13 (D) |
| 078 | 120 | do | Channel Register No. 14 (E). |
| 07C | 124 | do | Channel Register No. 15 (F). |
| 080 | 128 | do | Unassigned. |
| 084 | 132 | do | Do. |
| 088 | 136 | do | Do. |
| 08C | 140 | do | Do. |

The address indication in the extreme left column in Table A has the hexadecimal format. The second column in the table gives the decimal equivalent of the hexadecimal address.

In accordance with the present arrangements, the special words in memory 1 as depicted in Table A are accessed by operation of logic associated with the X and Y memory driving circuits shown in FIGS. 9a—9b and 11a—11b. When sequential accessing of portions of the special words is required, the Digit counter 35, FIG. 1, is employed for this purpose.

In a typical system, memory 1 will have a capacity that is adequate for most normally encountered data processing functions. As an example, a capacity of 8,000 bytes may be adequate. The size of memory 1 is not of particular significance, but Table A shows that 144 bytes are set aside in the system described herein for special words or registers that are available for a number of purposes. The Table shows a number of registers for index locations, a somewhat larger number of registers for channel locations, a number of unassigned locations, a double word location for storing Command key conditions, and several special register of particular interest in connection with FIGS. 6a and 6b, that is, the Instruction Address Word (IAW), the A Word, and the B Word.

Addressing of General Memory Locations

The circuits shown in FIG. 5 are provided for accessing general word locations in memory 1, that is, word locations other than the special address locations previously discussed. The circuits include a Storage Address Counter (STAC) comprising 14 trigger positions designated Y10—Y41. Positions Y11—Y41 provide sufficient capacity for accessing up to 8,192 bytes in memory 1. As an example, each byte comprises 8 bits of information. Position Y10 enables the accessing of a half byte of information in memory 1. The values stored in the Storage Address counter are detected and interpreted by decode circuits 33 corresponding to those shown in FIG. 1. The section 33a discussed in connection with FIG. 1 is not illustrated in FIG. 5 but is shown in several portions in FIGS. 9a—9b and 11a—11b. The decode networks in FIG. 5 develop four digits that together establish a hexadecimal byte address. Also incorporated in the circuits of FIG. 5 is a Digit counter comprising positions designated T1—T2—T4—T8—T16 and a Utility (U) counter comprising positions U1—U2—U4—U8. These latter counters cooperate with the Storage Address counter to access digits of information from an initial block address established by the Storage Address counter in memory 1. Digit counter 35 and Utility counter 36 work with the first digit decode networks to establish a sequential change in the hexadecimal byte address. The four positions T2—T4—T8—T16 of Digit counter 35 enable a sequential change in the hexadecimal address of up to 16 bytes, while the three positions U2—U4—U8 of Utility counter 36 enable the sequential change of up to eight byte addresses in the hexadecimal address. Position T1 of Digit counter 35 and position U1 of Utility counter 36 cooperate with the half-byte decode network for the selection of half-bytes, each comprising four bits each.

Figure 7A:
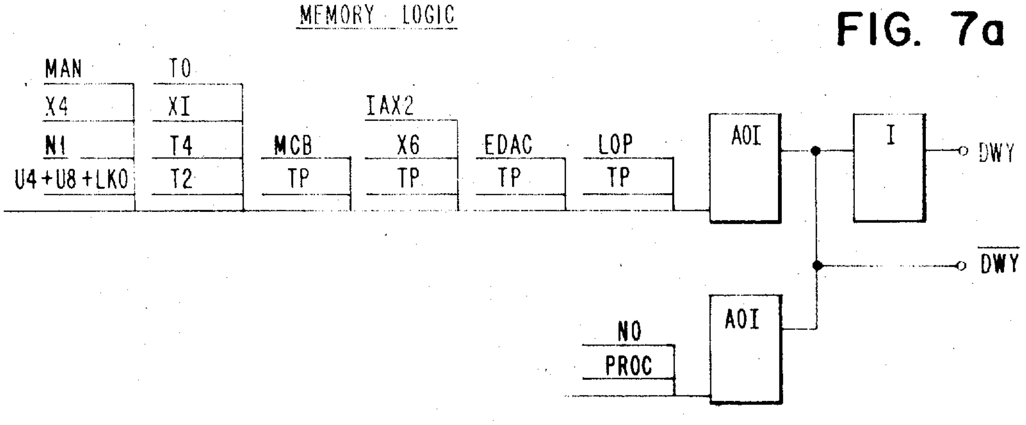
FIGS. 7*a* and 7*b* show logic provided in the system of FIG. 1 for controlling the storage address counter, the digit counter, and the utility counter accessing circuitry in FIG. 5.
Figure 7B:
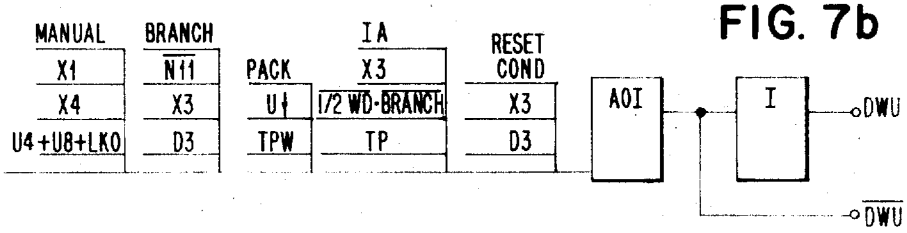

The memory addressing circuits of FIG. 5, including the Storage Address counter (STAC), the Digit counter, and the Utility counter (U) are selectively activated under various circumstances according to the logic illustrated in FIGS. 7a and 7b. The circuit of FIG. 7a supplies DWY and Not DWY signals with the DWY signal, in particular, selecting all positions of the Storage Address counter for controlling the accessing of locations in memory 1. In a similar manner, the circuit of FIG. 7b, provides DWU and Not DWU signals, with the DWU signal selecting the utility counter under circumstances to be discussed.

The logic is arranged in such a manner that the Not DWY and Not DWU signals combine to select the Digit counter. That is, the selection of the Digit counter occurs when neither the Storage Address counter or the Utility counter are selected.

Figure 8:
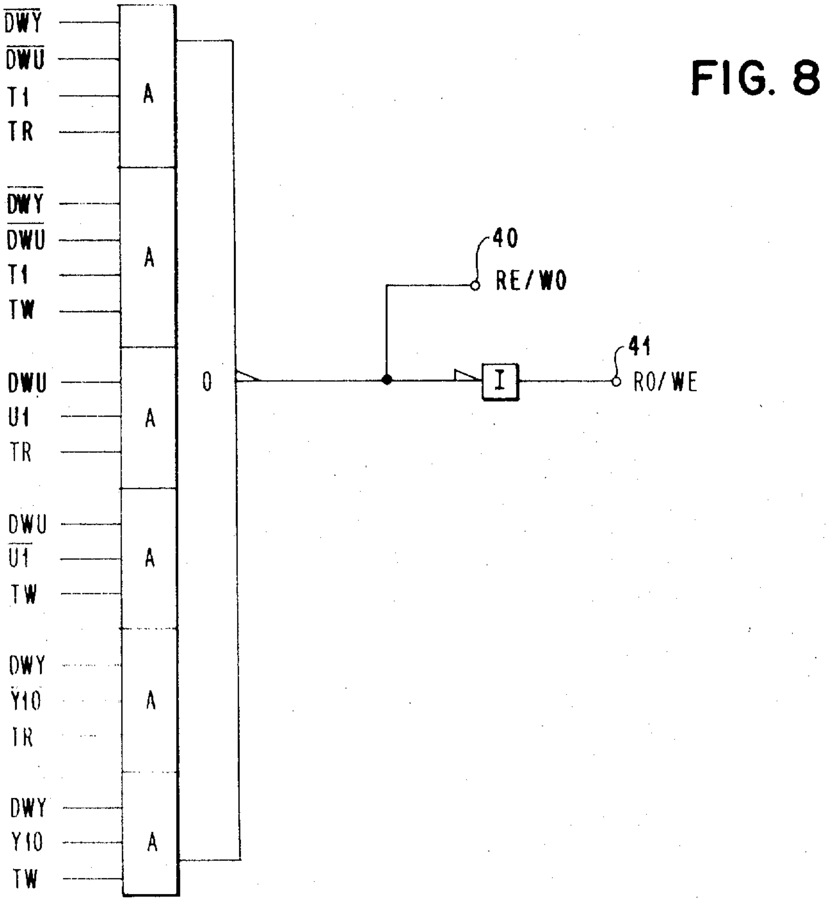
FIG. 8 represents a phase reversal control circuit used with the memory in the system of FIG. 1.

The circuit of FIG. 8 shows the logic involved in the accessing of half bytes of information under control of the Storage Address counter, the Digit counter, and the Utility counter. In the present case, it is assumed that memory 1 is a three-dimensional memory operating with half-select currents in the X and Y directions together with inhibiting currents that are selectively applied in a well known manner to insure the restoration of a desired bit configuration to memory. The memory, as an example, may use the commonly known phase reversal technique which involves the looping back of drive lines in the memory and further may incorporate a common sense inhibit line that is wound through the memory array in such a manner that it may serve both for sensing of information during reading operations and an inhibiting function during writing operations. As is known in the art, a memory wiring configuration featuring phase reversal normally requires that driving currents be established in alternately opposite directions on the driving line. Terminal 40, FIG. 8, provides a necessary logical driving interconnection for Read Even and Write Odd intervals while terminal 41 supplies a comparable logical interconnection for Read Odd and Write Even intervals.

Figure 9A:
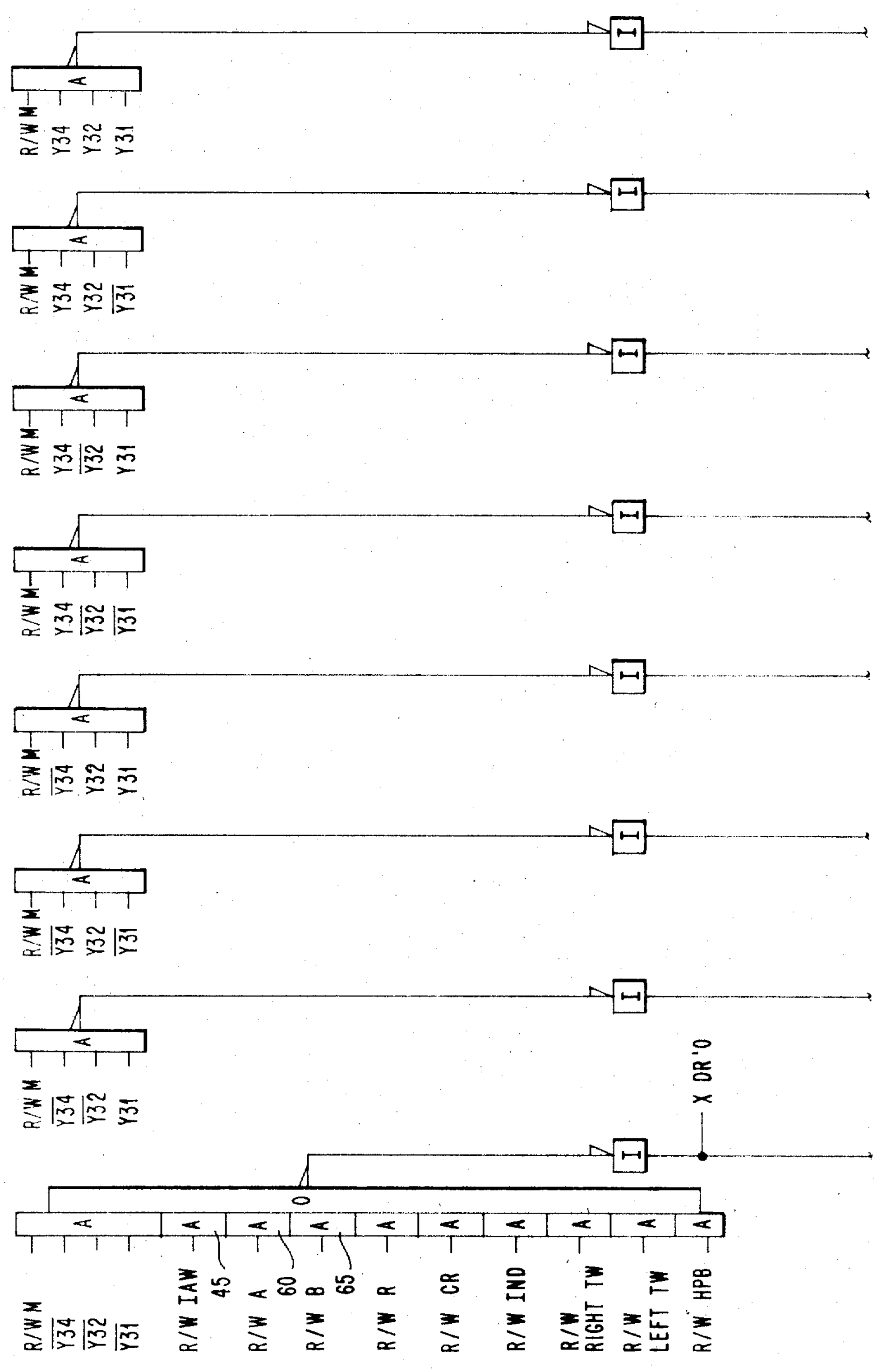
FIGS. 9*a* and 9*b*, when arranged as shown in FIG. 10, illustrate switching and driving circuitry concerned with the development of driving currents in the X direction in the memory of FIG. 1.
Figures 9A, 9B, 10:
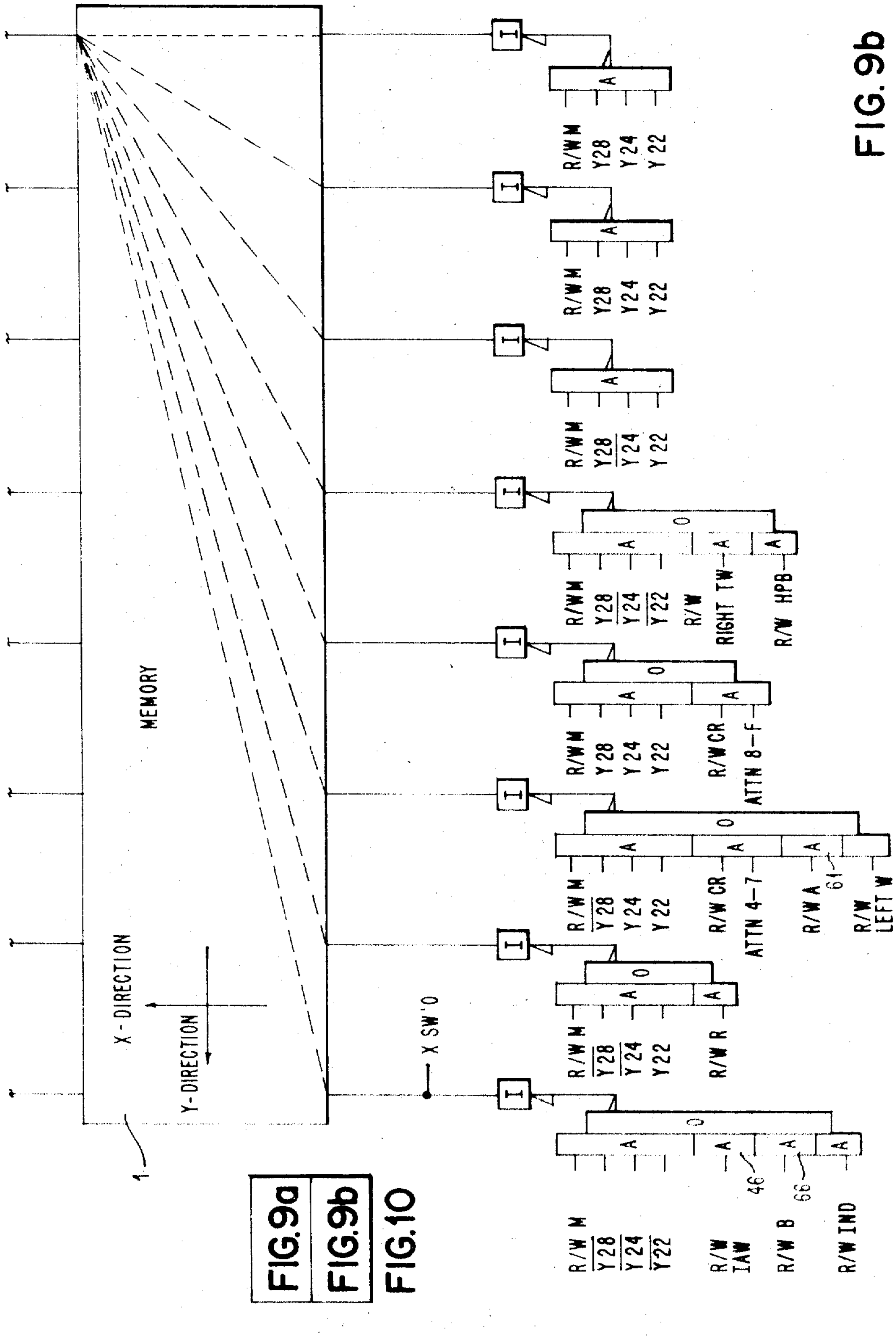

FIGS. 9*a* and 9*b* represent a typical memory wiring configuration for driving in the X direction. The eight drive lines in FIG. 9*a* are selectively interconnected with the eight lines in FIG. 9*b* to establish 64 driving combinations. The figures show logic involved for accessing memory 1 under control of the Storage Address counter, Digit counter, and the Utility counter in FIG. 5, as well as certain logic provided for accessing the special words in memory when required.

Figure 11A:
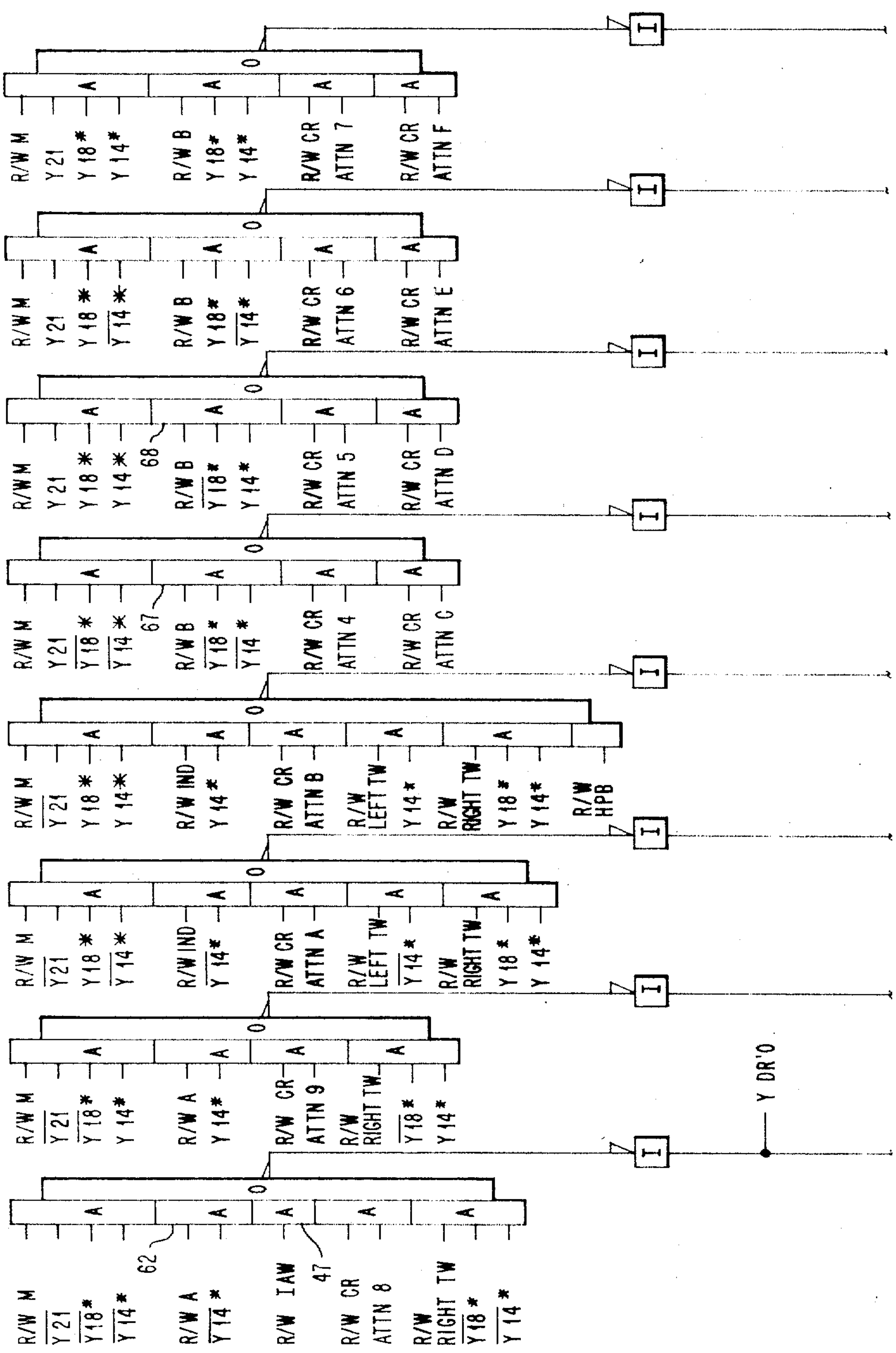
FIGS. 11*a* and 11*b*, when arranged as shown in FIG. 12, are similar to the circuits shown in FIGS. 9*a* and 9*b* and are provided for the development of driving currents in the Y direction in the memory of FIG. 1.
Figure 11B:
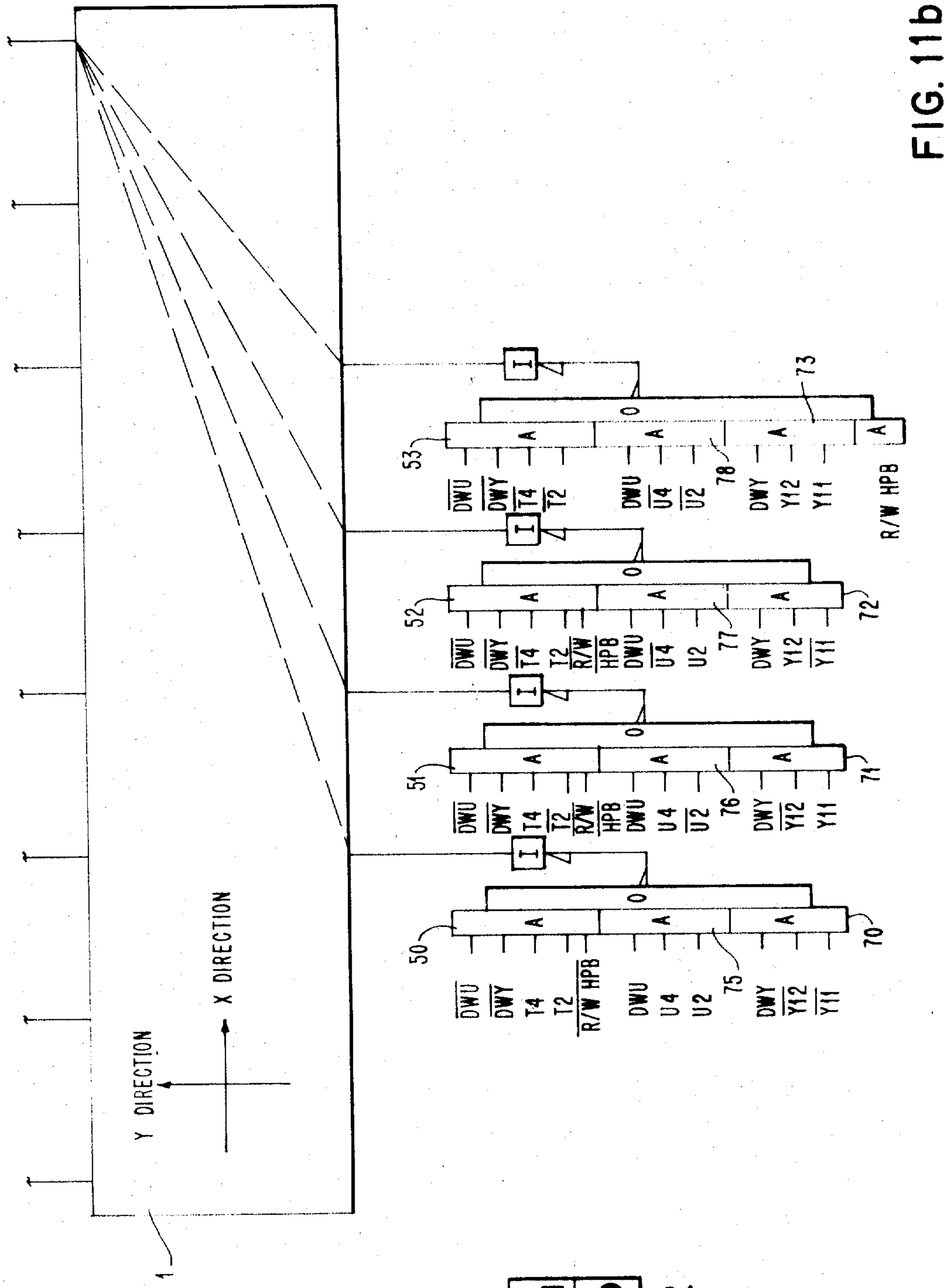
Figure 12:
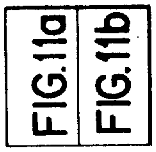

The circuits of FIGS. 11*a* and 11*b* show eight lines in FIG. 11*a* interconnected with four lines in FIG. 11*b* to supply 32 combinations for selection of memory 1 in the Y direction under control of the circuits of FIG. 5 and the logic required to access the special words. As previously indicated, the capacity of memory 1 is variable depending upon the requirements of the user, and the circuits of FIGS. 9*a*—9*b* and 11*a*—11*b* cooperate for the selection of 2,048 bytes of information.

Instruction Format

The computer system in FIG. 1 makes use of a number of basic instruction formats designated SS, SI, RX, and I/O and arranged as shown as follows:

INSTRUCTION FORMATS

SS denotes a storage-to-storage operation.

0 7 8 11–12 19–20 23 24 31

| OP | B1 | D1 | B2 | D2 |
|---|---|---|---|---|

SI denotes a storage-immediate operation.

0 7 8 15 16 19–20 31

| OP | I2 | B1 | D1 |
|---|---|---|---|

RX denotes a register-to-storage or storage-to-register operation.

0 7 8 11–12 15 16 19–20 31

| OP | R1 | 0000 | B2 | D2 |
|---|---|---|---|---|

I/O denotes an input/ouput operation.

0 3 4 7 8 15–16 19–20 31

| OP | DA | FS | B1 | D1 |
|---|---|---|---|---|

A brief description of the four instruction formats shown above is presented below.

SS Instruction Format

In the SS Instruction Format, the first operand is specified by B1, D1 and the second operand by B2, D2. Either B2, D1 or B2, D2 may be addressed directly or by the rules of effective addressing. Results of operations replace the first operand. The same address can be specified for both operands. The abbreviations used are set forth in the terminology listing previously given. In developing effective addresses, the system operates according to the principles set forth in the IBM 360, Model 20 Computer Manual referenced above. The B1 and B2 portions of the instruction refer to a base register or index register and the D1 and D2 portions signify a displacement factor, that is a B location and a displacement value are considered for the development of an effective address for the operands involved.

In order to generate an effective address, the contents of the base register specified by the B field of an instruction are added to the contents of the D field of the instruction to form the effective address. This type of address modification is commonly referred to as indexing. Indexing may be either in a positive or negative direction and is determined by the sign of the base address. Any one of the registers 8—15 may be specified in the B field of an instruction as the location of the base address for effective address generation. The program may have "0's" in the general register containing the base address or in the displacement field of the instruction when effective address generation is specified. Since a zero indicates the absence of the corresponding address component, the effective address generated is the same as the direct address with the nonzero component. Effective addressing is useful for program routines which require address modification.

SI Instruction Format

The SI Instruction Format contains an operand in the I2 field that is immediately available for use in the operation specified. The first operand address is derived from the B1—D1 fields. The comments made in connection with the SS Instruction Format are generally applicable to the SI Instruction Format as far as the development of effective addresses is concerned.

RX Instruction Format

Binary half word arithmetic instructions make use of the RX Instruction Format. In this format, R1 specifies the address of the index register containing the first operand. The address of the second operand is derived from the contents of the B2 and D2 fields and may be either direct or effective. Results of operations replace the first operand.

I/O Instruction Format

In the I/O Instruction Format, the Device Address (DA) specifies the I/O device for testing purposes, for control purposes, or to which output data is to be transmitted or from which input data is to be received. The Function Specification (FS) has a varying function depending upon whether the I/O device is being tested, controlled, or involved in a data transfer operation. If the device is being tested, the Function Specification specifies a particular condition or indicator to be tested. If the device is to be controlled, the Function Specification specifies the particular component in the device addressed. If the operation involves a data transfer, the Function Specification specifies the input or output function to be performed on the I/O device addressed and also the field or record length of the input or output data in main storage. As with the Function Specification, the B1, D1 fields have a varying purpose depending upon the type of operation. During a test I/O operation, the updated instruction address is replaced by the branch address derived from the B1 and D1 fields. In a control operation, a detailed specification of the control function to be performed is derived from the contents of the B1 and D1 fields according to the rules for direct or effective address generation. In a transfer data operation, the main storage location of the first byte in the input or output data field is derived from the contents of the B1 and D1 fields according to the rules for direct or effective address generation.

Basic Instruction Set

Within the four general instruction format types discussed above, there are a number of basic instructions as set forth in Table B.

TABLE B.—BASIC INSTRUCTION SET

Figure 3

| | | Operation codes | | |
|---|---|---|---|---|
| | Modifier | Mnemonic | Code | Format |
| Add Decimal | Single | AS | 01 | SS |
| | Double | AD | 02 | SS |
| | Mixed | AM | 06 | SS |
| Sub Decimal | Single | SS | 11 | SS |
| | Double | SD | 12 | SS |
| | Mixed | SM | 16 | SS |
| Zero and Add | Single | ZAS | 21 | SS |
| | Double | ZAD | 22 | SS |
| | Mixed | ZAM | 26 | SS |
| Multiply Decimal | Double | MD | 42 | SS |
| | Quad | MQ | 46 | SS |
| Compare Decimal | Single | CS | 31 | SS |
| | Double | CD | 32 | SS |
| | Mixed | CM | 36 | SS |
| Shift Right | Single | SHS | 51 | SI |
| | Double | SHD | 52 | SI |
| | Quad | SHQ | 56 | SI |

TABLE B.—BASIC INSTRUCTION SET

Figure 3

| | Modifier | Operation codes Mnemonic | Code | Format |
|---|---|---|---|---|
| Edit | Length | ED | B– | SS |
| Branch on Condition | | BC | 81 | RX |
| Control I/O | | CIO | 6– | IO |
| Transfer I/O | Length | XIO | 7– | IO |
| Test I/O and Branch | | TIOB | 8– | IO |

Optional Instructions

The system has a number of optional instructions available as set forth in the following Table C.

TABLE C.—OPTIONAL INSTRUCTIONS

| | Modifier | Operation codes Mnemonic | Code | Format | Group |
|---|---|---|---|---|---|
| Divide Decimal | Single | DS | 49 | SS | Divide. |
| | Double | DD | 4A | SS | Do. |
| Pack | Length | PACK | 9– | SS | With I/0 Adapter Addition. |
| Unpack | Length | UNPK | A– | SS | Do. |
| Move Immediate | | MVI | E4 | SI | Logical Ops. |
| Move | Length | MVC | D– | SS | Do. |
| Compare Logic Immediate | | CLI | E2 | SI | Do. |
| Compare Logic | Length | CLC | C– | SS | Do. |
| And | | ABD | E1 | SI | Do. |
| Or | | OR | EO | SI | Do. |
| Test Under Mask | | TM | E3 | SI | Do. |
| Branch and Store | | BS | 82 | RX | Do. |
| Load Halfword | | LH | 28 | RX | Indexing. |
| Add Halfword | | AH | 08 | RX | Do. |
| Sub Halfword | | SH | 18 | RX | Do. |
| Compare Halfword | | CH | 38 | RX | Do. |
| Store Halfword | | STH | E8 | RX | Do. |

TYPICAL OPERATIONS

Operation Involving SS Instruction

The following summarizes an operation involving an SS instruction format.

Figure 13:
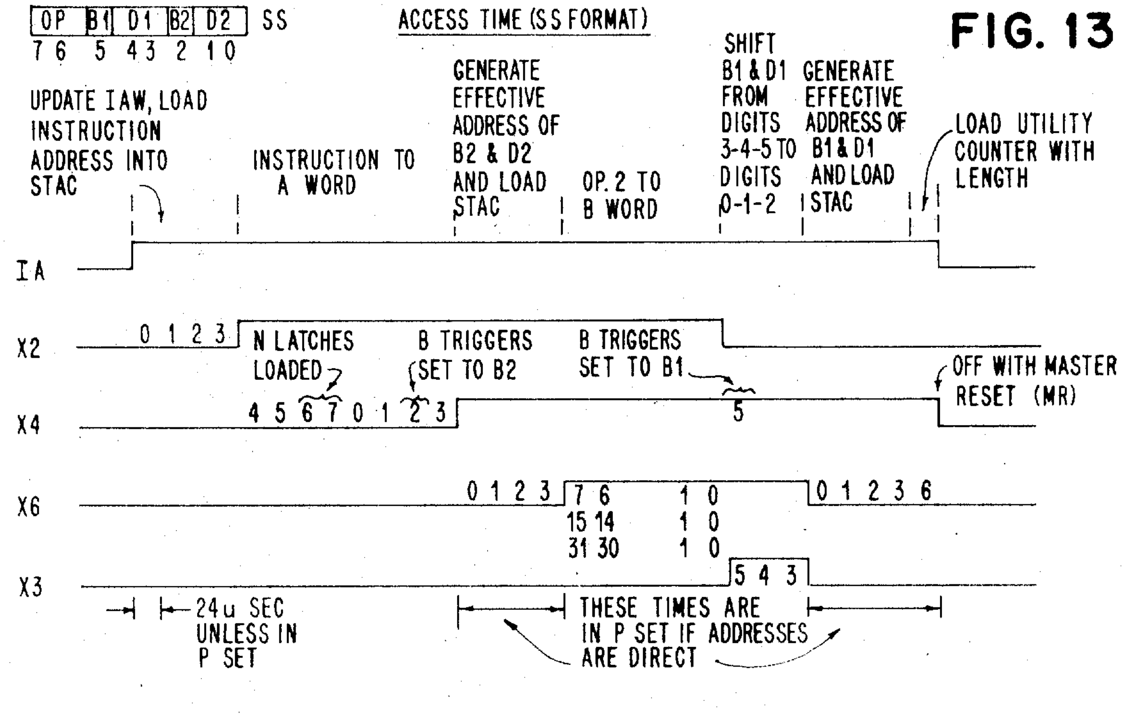
FIGS. 13—18 illustrate operational sequences as follows.

Summary, Access Time (IA) - SS Format (FIG. 13)

The SS format is the only format which requires generation of two effective addresses during access time. Also, it is the only format requiring the loading of a length (digit 6) into the U counter. The Digit counter maintains a count of the digit intervals.

1. The IAW is read at TPR and transferred to the A's. Updating is accomplished by setting S4 and writing back into the IAW with BEN. STAC is loaded with (BE to Y).
2. X2 comes on after D3. In the state X2X4, the instruction is transferred to the A word. The N latches are set with the Op. code. The B's are set according to the B2 field.
3. X4 comes on after D3. Note that T4 is inhibited from coming on as X4 turns on. In the state X4X6, the effective address is generated. X2 indicates operand 2 address.

If B8 is on, the register is read at TQ time and is added to the contents of the A word; and the result is loaded into STAC. If B8 is off, the X4X6 state is in P SET, so only the contents of the A word are loaded into STAC.

4. After D3, X6 comes on. At this point the state of the Digit counter depends on whether the rightmost operand is to be single, double or quad. Note that for PK, MBC and CLC the B word is loaded beginning at digit 31. If the length is small enough, there are provisions for turning X3 on (ending the transfer) after eight or after 16 digits. In the state X6X3 operand 2 is transferred to the B word. Memory is addressed using DWY and (Y UP). The terms DBL and QUAD are not used; T8 and T16 are forced on if needed.
5. X3 comes on after DO normally or after sufficient length for PK, MVC and CLC.

In the state X3 digits 5—4—3 of the A word are transferred to digits 2—1—0 of the A word by use of DWU.

As X3 comes on, U2 is forced on, and the digit counter is forced to D5. At D5 the B's are set according to the B1 field.

6. After D3, X3 & X6 go off, note that X2 went off as X3 came on. In the state X4X6, the effective address is again generated, but X2 says that operand 1 address is being obtained. The logic concerning B8 and (BE to Y) is the same as before.
7. After D3, T2 is inhibited from counting off so that D6 is addressed. The A word is read. One is added by forcing CD on. The result is loaded into the U's in order to have the length in a useful counter.
8. After X4X6 D6, execute time is initiated by calling IE. This turns JA off and gives a reset time. At this MR time, the Y's, B's, U's, and N's will not be reset. The data these devices hold is necessary for executing the operation.

SS Summary of Conditions at End of IA:

1. Operand 1 address is STAC.
2. Op. code in N register.
3. Length count (digit six or rightmost 4 bits of the Op. code) +1 in U counter.
4. B1 field in B latches.
5. Operand 2 loaded in B word.

Detailed Description of Operation Involving SS Instruction Format

Figure 6A:
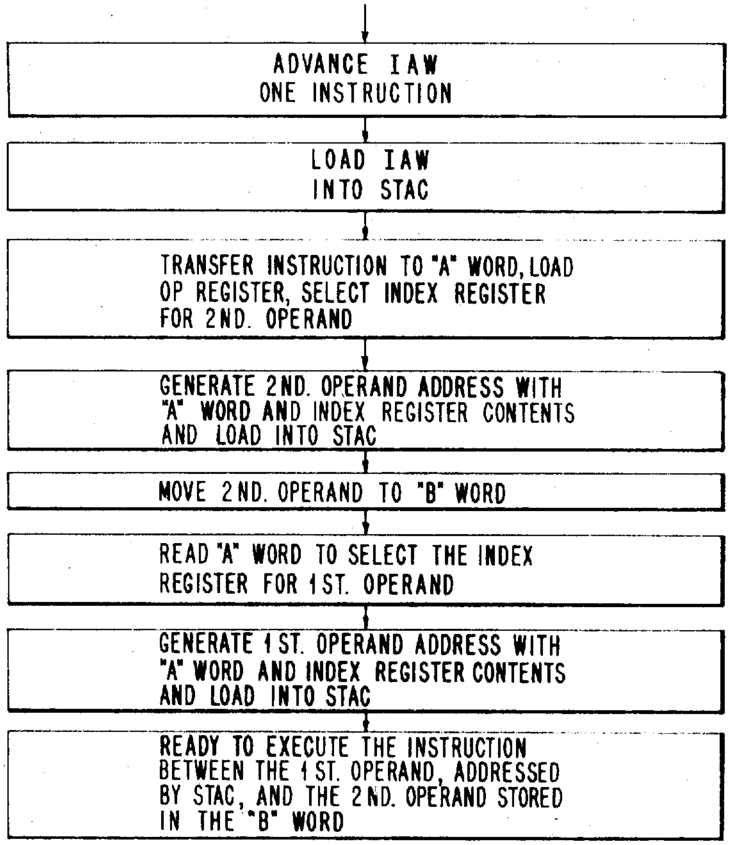
FIG. 6*a* illustrates instruction and data flow when an SS instruction is involved.
Figure 6B:
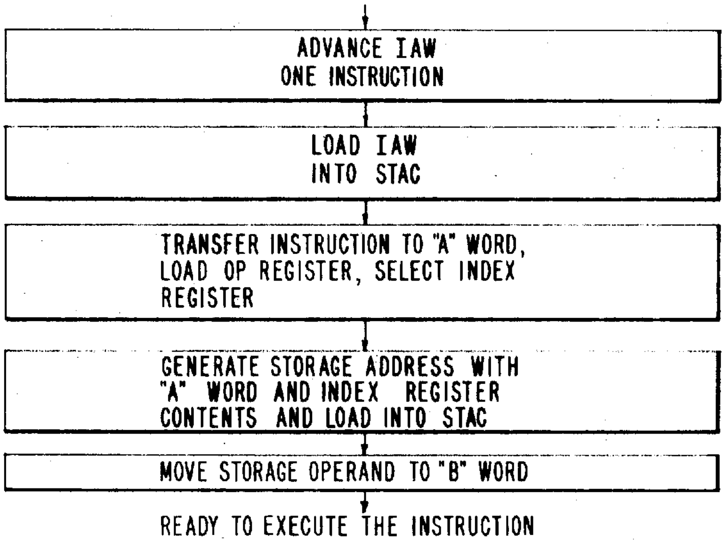
FIG. 6*b* is similar to FIG. 6*a* with the exception that it involves the instruction formats SI, RX, and IO.

Reference is made to FIG. 13 which is a timing chart that illustrates the sequencing involved with an SS Instruction Format. FIG. 6*a* is a flow diagram that is related to the sequence chart of FIG. 13. Also, reference is made to the system diagram of FIG. 1. The special address in memory 1 designated Instruction Address Word (IAW) contains the address of the previous instruction that was executed. As shown in FIGS. 6*a* and 13, the IAW location is accessed from memory 1, a value "4" is added, and the new instruction address is loaded into STAC. The operation of the system is under control of various logic contained in block 4, FIG. 1, as well as clock 5. At this time the logic is such that the IAW location is accessed under control of the various driver and switch combinations and drive line interconnections established in FIGS. 9*a*—9*b* and 11*a*—11*b*. Selection in the X direction is performed by gating of the R/W IAW And circuit 45, FIG. 9*a*, and the R/W IAW And circuit 46, FIG. 9*b*. Accessing of individual digits within the IAW location is controlled by gating of the R/W IAW And circuit 47, FIG. 11*a*, and particularly by the individual digit And circuits 50—53, FIG. 11*b*, that are controlled by the T2 and T4 terms generated by the respective trigger positions of the Digit counter.

As indicated in the summary above, the logic 4 incorporates a number of triggers designated X2—X3—X4—X6 that, as shown in FIG. 13 generate the various timing intervals that are required during this operation. Logic 4 also has triggers X1 and X5 that are not involved in this operation. The detailed gating and logic circuits for triggers X1—X6 are shown in FIGS. 19—24, inclusive. Not X2, Not X3, Not X4, and Not X6 establish the digit time intervals 0—1—2—3 during which the IAW contents are accessed. The IAW has four digits that are brought in succession from memory 1 into the S register 10, and subsequently transferred to the A Register 11, FIG. 1. From there, they are transferred through accumulator 12 into the Storage Address counter 32 for control of the decode networks 33. Concurrently, with accessing of IAW, a value of "4" is entered in the S register 10. The current value in the IAW as entered in the A register 11 via S Register 10 is updated by the addition of the value "4" set in the S register by additioning accumulator 12 and restored through write control 3 into memory 1. Thus, the IAW, as is STAC, is now storing the current instruction address.

Figure 20:
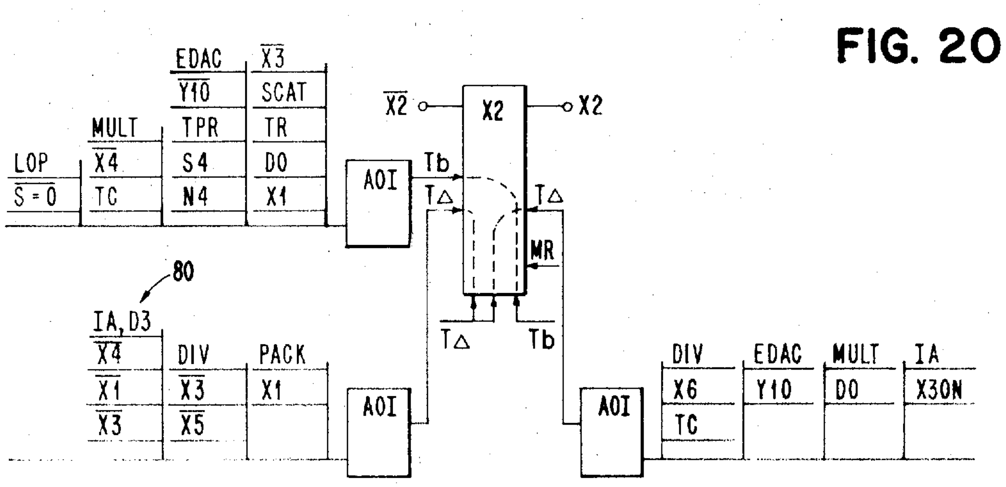
Figure 21:
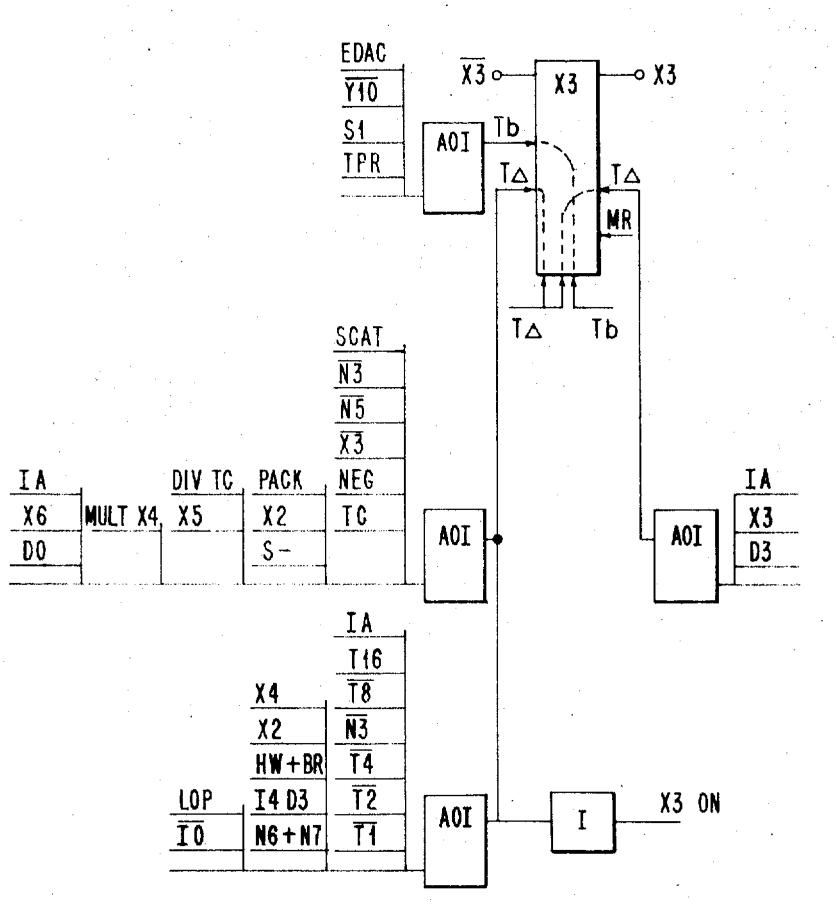
Figure 22:
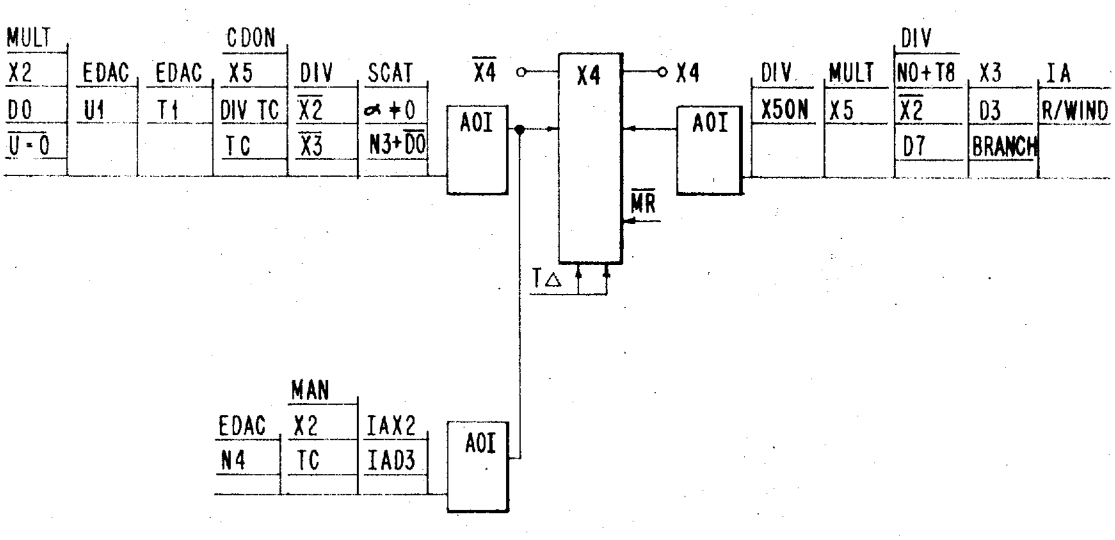
Figure 23:
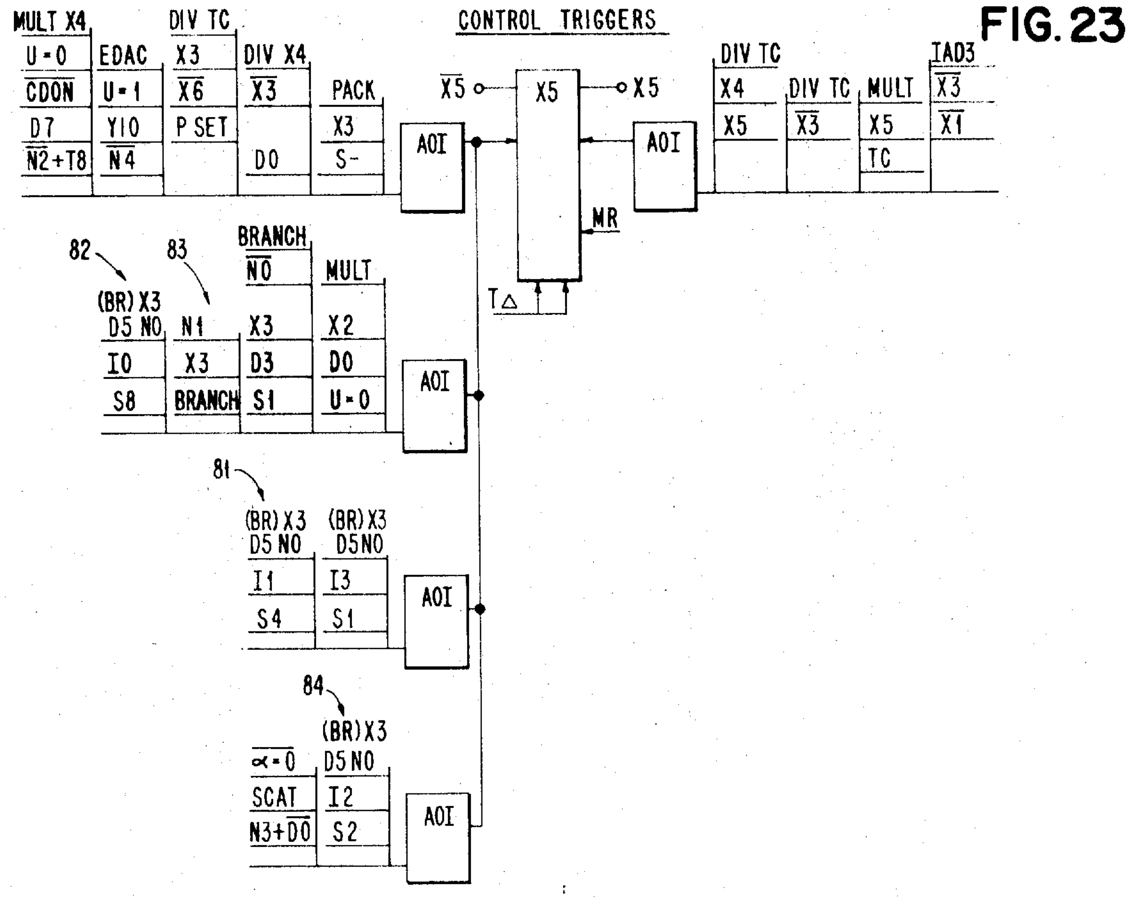
Figure 24:
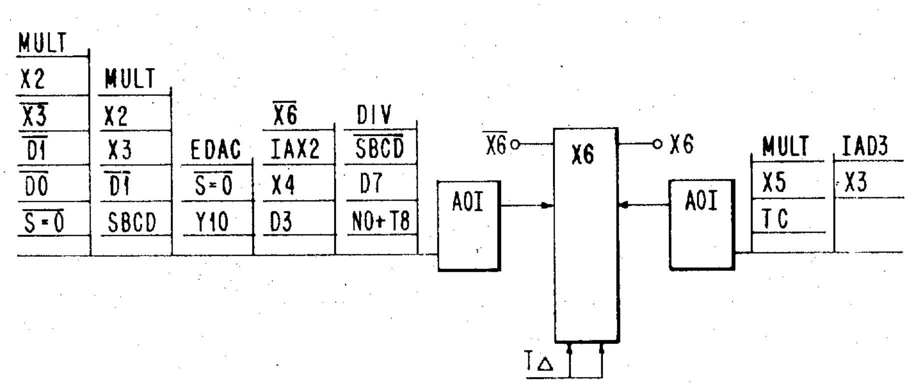

As shown in FIGS. *6a* and 13, the contents of the word of memory designated by the IAW in STAC are accessed during the next time interval and entered in the A Word in memory 1. This interval is defined by X2, and Not X4. Trigger X2, FIG. 20, is set through And circuit 80 at the end of Digit 3 (D3) time. The other X triggers involved are set as required as shown in FIG. 13 under control of their respective gating logic in FIG. 21 (X3), FIG. 22 (X4), and FIG. 24 (X6). The drivers and switches associated with memory 1 are activated as necessary in FIGS. *9a*—*9b* and *11a*—*11b* in order to access the proper instruction. Control logic 4 generates the necessary signals to activate the special address selection network *33a*, FIG. 1. More specifically, the AND circuits 60, 61, and 62 in FIGS. *9a*, *9b*, and *11a*, respectively are activated at this time. The And circuits 50, 51, 52, 53, FIG. *11b*, control the accessing of the digits in the A Word in a manner similar to the accessing of the digits in IAW previously described.

Following this, an effective address is generated taking into account the contents of the base register indicated in B2 of the instruction and the displacement indicated in D2 of the instruction. The effective address is loaded in STAC as indicated in FIGS. *6a* and 13. The contents of STAC now indicate the location of the second operand required during this operation. Accordingly, the STAC contents control the accessing of this operand from memory 1 and the operand is placed in the B Word. And circuits 65, 66, 67, and 68 in FIGS. *9a*, *9b*, and *11a* are used to control accessing of the B Word. And circuits 50—53, FIG. *11b*, control the accessing of the individual digits of the B word as before. The drive lines for accessing the instruction word location are controlled by And circuits 70—73 indicated in FIG. *11b*.

Following the entry of the second operand in the B Word in memory 1, the B1 and D1 factors in the present instruction are used to develop an effective address for the first operand. This is loaded into STAC. If the optional instruction "Move" is involved, the length count is entered in the Utility counter 36, FIGS. 1 and 5.

Following the completion of the Access Time, the operation called for in the particular SS instruction is actually performed using the two operands, one of which is in the B Word and the other of which is accessed under control of the contents of the STAC.

Operation Involving RX, I/O, or SI Instruction Format

The principles of memory accessing just discussed in connection with the SS Instruction Format are applicable to an operation involving the accessing and execution of an RX, I/O, or SI Instruction Format as set forth in the following summaries.

Figure 14:
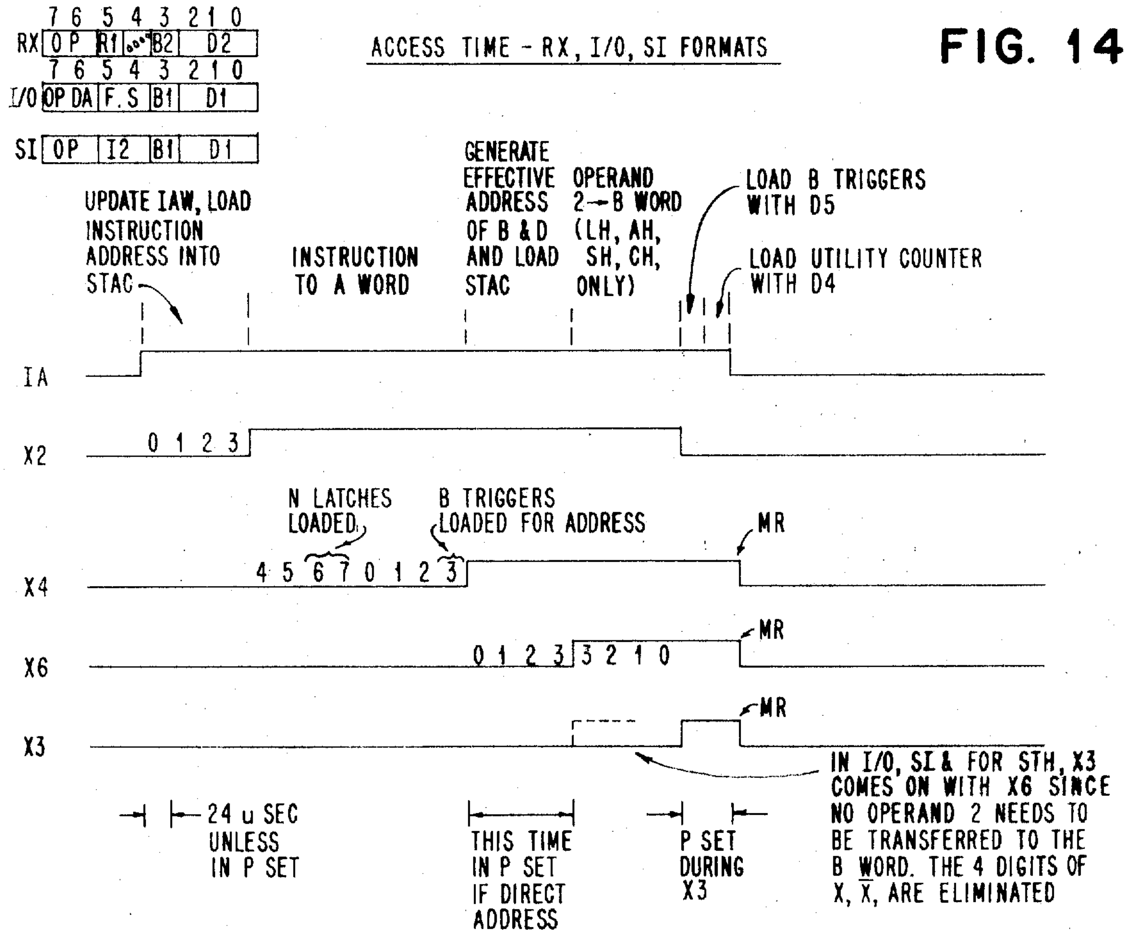

Summary, Access Time—RX Format (FIG. 14)

(Except BC, BS, and STH Instructions)

This logic applies only to the halfword operations. The only difference between these instructions and the SI and I/O formats and the store halfword instruction is that the rightmost operand (B1 and D1 fields) is loaded into the B word.

Only one timing is given for this section and the next one. See FIG. 14.

1. The logic is the same as for the SS format until X3 comes on. Note that the B's loaded during X2X4 at D3 instead of D2. This is because the B and D fields are four digits long instead of three digits as in the SS format. For loading the B and D field operand into the B word, only digits zero through three are used since only halfword operands are considered.
2. Note that as the effective address is generated in the X4X6 state, the result is stored back in the A word as well as being loaded into STAC.
3. X3 comes on at the same time as in the SS format. But X3 time is in P SET. At D5, the R1 field is loaded into the B's At D4, the U's are loaded (with zero in this format)
4. After X3D4, IE time is called and IA ends.

RX Summary of Conditions at End of IA

1. Operand 2 address in STAC and in A word.
2. Op. code in N register.
3. U's set to zero (zero in digit 4).
4. R1 loaded in B's.
5. Operand 2 loaded in B word.
6. The A word contains the instruction except that digits zero thru three contain the effective operand 2 address.

Summary, Access Time—I/O and SI Instruction (FIG. 14)

The timing chart and logic for these formats are the same as for the RX format except that no operand needs to be loaded into the B word. Hence, X3 comes on as X6 comes on.

Note that the B's and the U's are loaded with the I2 on the F.S. information. It is very useful in JE time to have these 8 bits (as well as the 8 bits of the Op. code) stored in latches.

One I/O instruction which does not follow this logic is Reset Condition (or Control I/O for the Command Key Unit). It operates like a branch and will be discussed in the next section.

SI, I/O Summary of Conditions at End of IA:

1. Operand 1 address in STAC and in A word.
2. Op. code in N register.
3. Digit 4 (rightmost 4 bits of the F.S. or I2 field) is loaded in the U counter.
4. Digit 5 (leftmost 4 bits of the F. S. or I2 field) is loaded in the B's.
5. The A word contains the instruction except that digits zero thru three contain the effective operand 1 address.

Detailed Description—RX, I/O and SI

The RX, I/O, and SI Instruction Formats differ from the SS Instruction Format previously discussed in that only a single effective address for one operand need be generated rather than two effective addresses for two operands as with the SS Instruction Format. The sequencing for Instruction Formats other than the SS Instruction Format is shown in FIGS. *6b* and 14.

The activation of the control triggers X2—X3—X4—X6 in control logic 4, FIG. 1, occurs in a manner comparable to that shown in FIG. 13 with the exception that a shorter cycle is necessary due to the fact that only one effective address is being generated. The instruction indicated by IAW is accessed from memory 1 and placed in the A Word. Following this, the B and D factors in the Accessed Instruction are used to generate an effective address for obtaining the operand in storage designated operand 2. For the RX format, the operand is entered in the B Word by gating the appropriate drive circuitry in FIGS. *9a*—*9b* and *11a*—*11b*, as before.

Following the entry of the operand in the B Word, the logic controls the sequencing so that the particular instruction accessed and presently in the A Word is executed in accordance with OP code contained in the instruction.

Operation Involving Branch or Reset

A summary of an operation involving a Branch or a Reset condition is given below.

Figure 15:
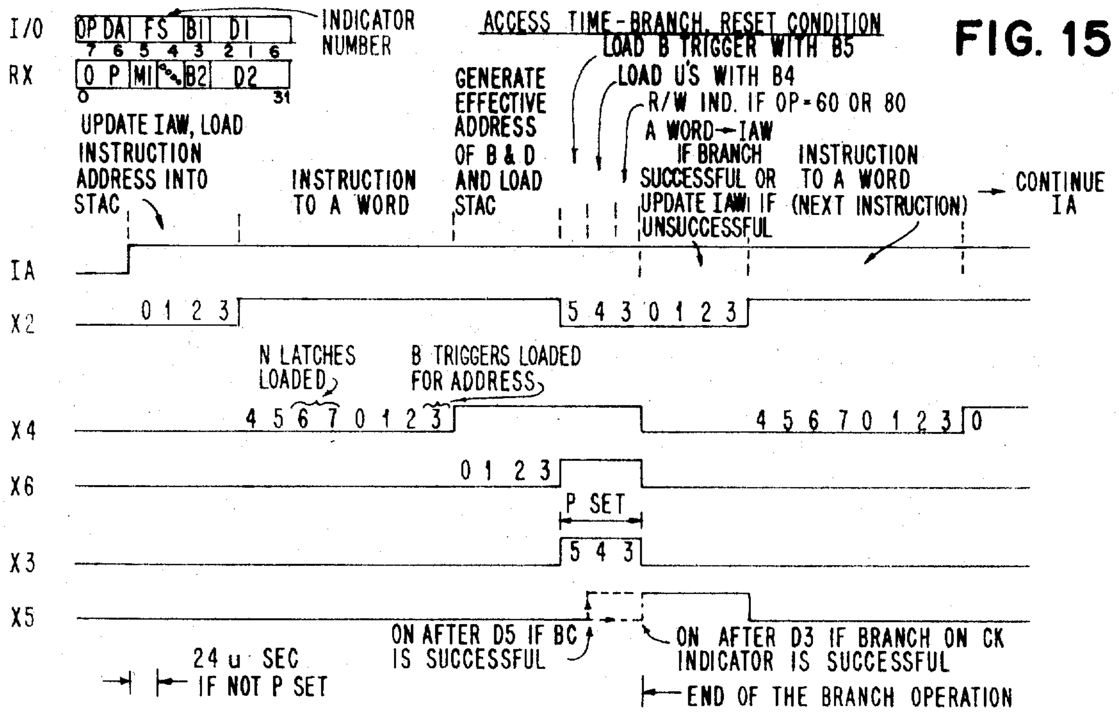

Summary, Access Time-Branch, Reset Condition (FIG. 15)

This logic applies to Branch on Condition, Branch on Indicator (TIOB to the Command Key Unit), and Reset Condition (CIO to the Command Key Unit).

1. The logic is the same as that for the SI and I/O formats until X3 comes on. During X3 the B's and the U's are loaded exactly as for the RX, SI, and I/O formats. The additional logic is that branching conditions must be sampled or indicators reset.
2. For BC the mask (M1) (contained in S8, S4, S2, S1) is compared to the Condition Code latches (I0, I1, I2, I3). If the condition is satisfied, X5 comes on after D5 of X3 time.
3. For Branch on Indicator the specified indicator (loaded at D4 into the U's) is read at D3 of X3 time. DWU is high to address the specified digit of the Indicator Word; the indicator is simply the 1-bit of that digit. If the indicator were on, X5 comes on after D3. The indicator is written back.
4. For Reset Condition, the indicator is read at D3 and is not written back; thus, it is set to zero. X5 does not come on.
5. After X3, IA does not got off. If X5 is off (condition not satisfied) then access time of the next instruction proceeds normally. Since there is no reset time, certain reset terms have to be forced on during IA (Reset Y's, Reset N's).
6. If X5 is on then the A word is transferred to the IAW instead of reading the IAW and updating it. Since the A word contains the effective address of the location to which to branch, then the IAW is loaded properly with the address of the step to be accessed next. STAC is loaded as this transfer is made.
7. X2 comes on as usual, and the next access time continues normally.
8. Hence, for a successful branch, new data is simply loaded into the IAW in order to accomplish the branch.

Branch Summary

The required function is performed entirely in IA time, The next instruction (whether or not a branch is taken) is accessed normally.

Detailed Description - Branch

In connection with the foregoing summary, a branch operation is of particular interest. Reference is made to FIG. 15 which illustrates the sequencing during the access time for a Branch (and incidentally a Reset condition). Control logic 4 operates triggers X2—X3—X4—X6 as necessary to establish the sequencing required. In addition, a trigger X5 is operated to test for a high, low, equal, or overflow condition in circuit 14, FIG. 1. If the condition tested is satisfied, then X5 turns on and the contents of the A Word, accessed previously in the sequence are transferred to IAW and thereafter establishes the address of the next instruction to be accessed and subsequently executed. X5 is gated when required through And circuits 81—84, FIG. 23.

Operation Involving Branch and Store

The following summarizes the access time for a Branch and Store operation.

Figure 16:
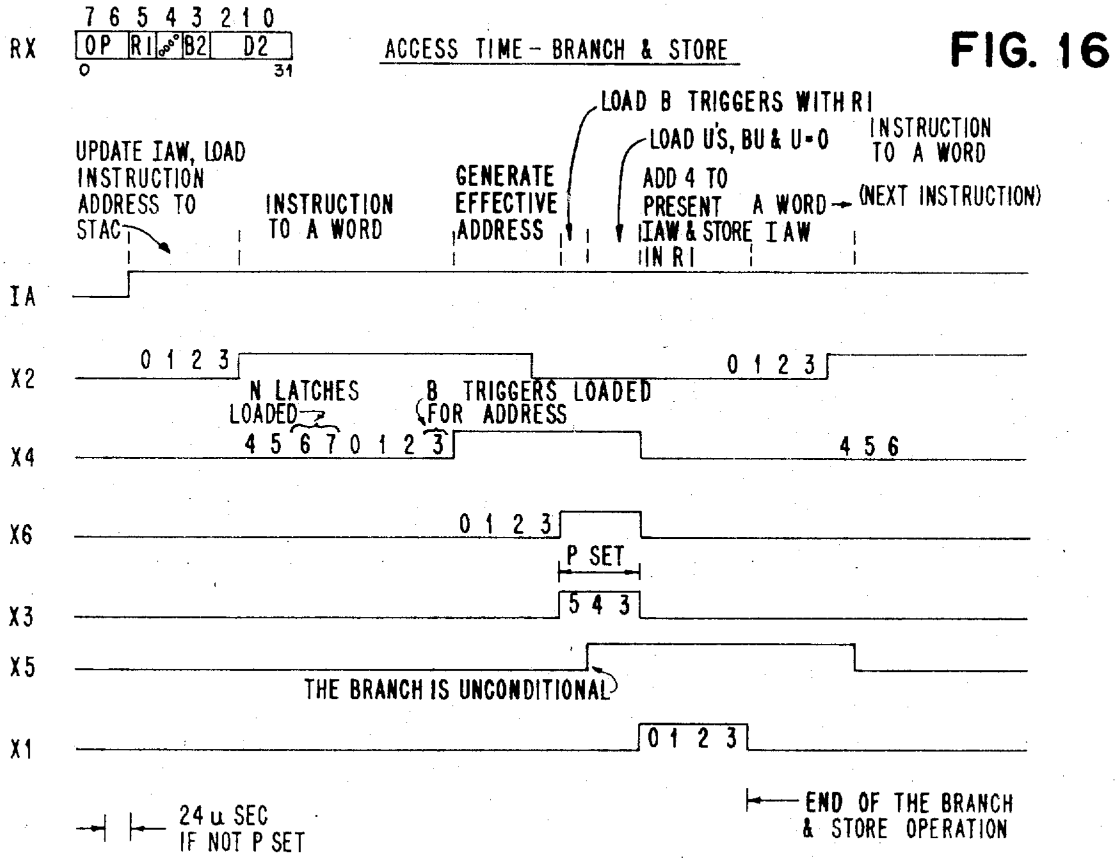

Summary, Access Time-Branch and Store (FIG. 16)

The logic for Branch and Store is identical to that of an unconditional branch with the exception that the time defined by X1 is inserted at the end of the operation.

1. X1 comes on after D3 in X3 time. During X1 time the present IAW is increased by four and is loaded into the registered specified by the B's (the R1 field).
2. This addition is like a standard accumulator cycle except that the data read from R1 is TPR time is not transferred to the A's. A4 is set for the addition of four to the data read from IAW at TQR. The result is written into R, at TPW time.
3. After X1 goes off, the branch address is transferred into the IAW, and access time continues normally.

Branch and Store Summary

1. The branch is unconditional.
2. The address of the next instruction after BS instruction is stored in the register specified by R.

Detailed Description—Branch and Store

The principles previously discussed are applicable to a Branch and Store operation, as well. As shown in FIG. 16, an additional trigger X1 is provided in control logic 4 to establish an additional time interval during which a count of four is added to the present IAW contents and IAW is stored in the register indicated by the R1 portion of the instruction. Trigger X1 is gated when required through And circuit 85, FIG. 19. This enables a linking of the Branch operation with the point in the program from which the Branch occurred in order that the system may return to that point and resume the subsequent program sequencing.

Figure 17:
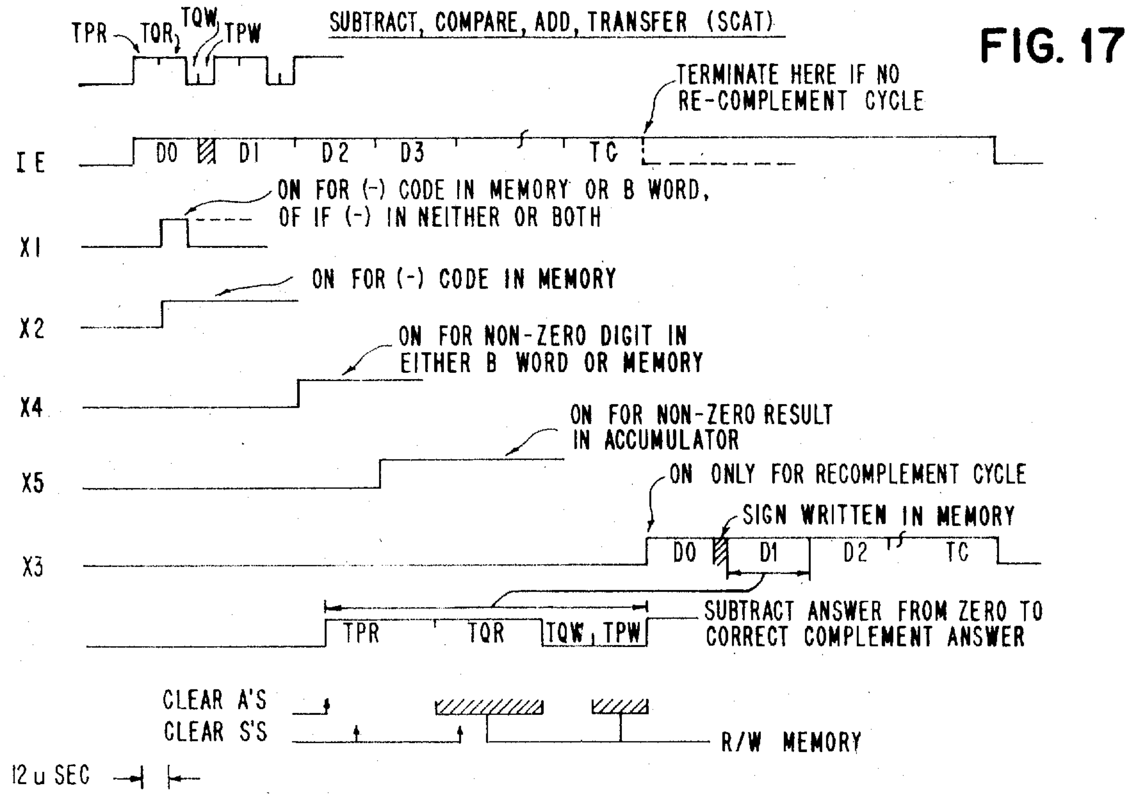

Sequential Addressing of Data in Memory Location Designated by STAC by Using Digit Counter FIG. 17 illustrates sequencing of the system during subtract, compare, add, and transfer operations. The logic controls triggers X1—X2—X3—X4—X5 to establish the sequencing involved. In the system of FIG. 1, decimal factors are assumed to be stored in true form, each accompanied by a plus or minus sign as appropriate to indicate whether they are a positive or negative value. When working with factors of this nature, the initial result of an operation, such as a subtract operation may actually be in a complementary from and require recomplementing in order to develop a true value. When this happens, the result location in memory may have to be accessed an additional cycle to perform the recomplementing. As shown in FIG. 17, the first portion of IE involves the accessing of the individual digits D0—D1, etc. The operand is basically designated by the contents of STAC and is accessed by appropriate activation of the driving circuits in FIGS. 9*a*—9*b* and 11*a*—11*b* is used in this instance to select the individual digits in the operand designated by STAC. Reference is made to FIG. 5 which shows the relationship of STAC comprising trigger positions Y10—Y41 and the Digit counter with triggers T1—T16. In FIGS. 9*a*, 9*b*, and 11*a*, the control of the drive lines by the contents of STAC is exerted by a number of And circuits that are readily identifiable by inputs designated R/W. Accessing of individual digits within a selected memory location is controlled by And circuit 50—53 shown in FIG. 11*b*. In an operation involving the recomplementing of a result, STAC retains the initial or starting address of the result in memory.

Referring to FIGS. 7*a* and 7*b*, logic is shown for the development of the DWY, Not DWY, DWU, and Not DWU control levels for gating STAC, the Digit counter, or the U counter, as required.

The STAC is set with the starting byte address of the location and memory involved. Throughout the operation indicated in FIG. 17, STAC retains this starting byte address. The circuits of FIGS. 7*a* and 7*b* are gated to provide Not DWY and Not DWU levels to activate Digit counter 35 in order that the sequencing of digits is controlled through And circuits 50—53 in FIG. 11*b* rather than 70—73. Thus, with STAC retaining the starting byte address, it is possible to return to this address and again access all of the digits of the location in memory so designated in order to perform the necessary recomplementing.

Sequential Addressing of Memory Locations Using Utility (U) Counter

The Utility (U) counter is used in a manner similar to the digit counter in certain operations. An example of this is the "-Pack" operation that is summarized as follows.

Figure 18:
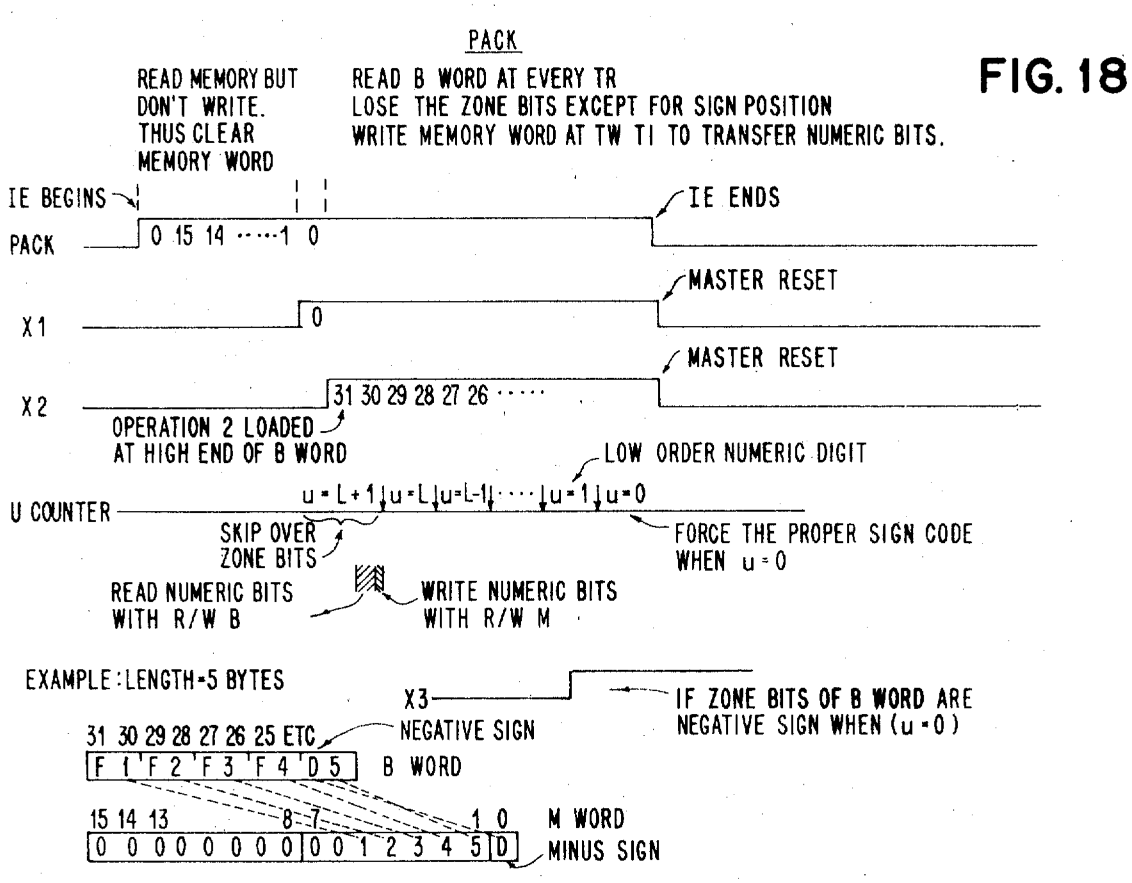
Figure 19:
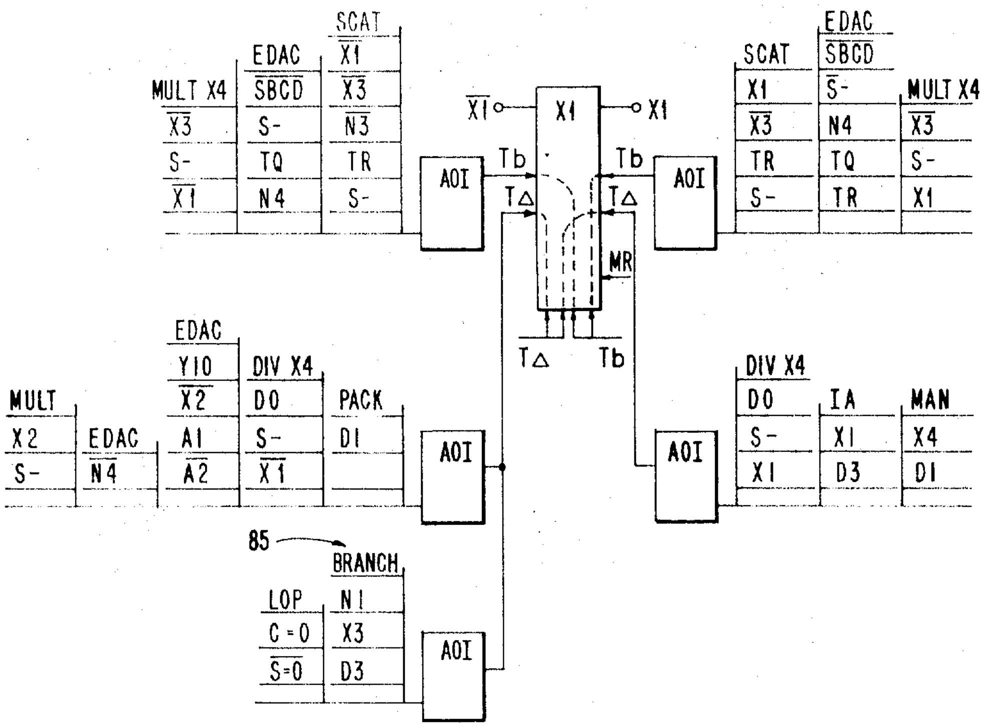
FIGS. 19—24 show control triggers X1—X6 and associated logic.

Summary, Pack Operation (FIG. 18)

1. The source (unpacked) field is loaded during access time into the B word, beginning at the high end (digit 31).
2. The object (packed) field must be a double word and is addressed with R/W M.
3. The actual length (L coded+1) is in the U counter.
4. First, in the state X1, the M word is read. There is no write term, so the M word is cleared. Note that DBL is high, so the digit counter counts down from D0 to digit 15.
5. The digit defined by X1X2 is used to count the digit counter down to digit 31 and to differentiate between this digit and the first D0.
6. In the state X2 the B word is read at every TR. But the M word is written for only the numeric 4 bits (T1). Thus, the zone bits (1111) are eliminated and the numeric bits are retained.
7. The data is put into the proper digit of the M word (depending on the length) by use of DWU.
8. When (U=0), corresponding to Do of the packed word, the proper sign is forced. If the sign of the B word is negative, X3 comes on. If X3 is on, the code is 1101; if positive, the code is 1111. The pack operation is terminated after the sign digit is processed.

Comment on Pack Operation

Reference is made to FIG. 18 which illustrates the sequencing involved during a Pack operation and which shows in an adequate fashion the operation of the Utility counter to access individual digits in a memory location, the initial position of which is addressed by STAC. The Utility counter outputs control And circuits 75, 76, 77, and 78, FIG. 11*b*, which override the STAC And circuits 70—73. Thus, the Utility counter when used in connection with STAC permits the sequential accessing of digits while retaining the initial starting byte address as in the recomplementing operation previously described in connection with the Digit counter.

Epilogue

From the foregoing description, it is apparent that the present inventive arrangements offer considerable flexibility and capability in computer or data processing systems with a minimum amount of hardware.

While the invention has been particularly shown and described with reference to a preferred embodiment, it will be understood by those skilled in the art that various changes in format and detail may be made without departing from the spirit and scope of the invention.

What we claim is:

1. A computer system for processing data operands according to instruction words representative of program sequences, each of said program sequences involving microprogram routines having accessing and transfer sub-sequences and execution sub-sequences arranged according to predetermined instruction word patterns, and each of said instruction words including an operation code and an address code of at least one data operand required to be processed, said system comprising:

means responsive to operation codes in said instruction words to develop operation code signals;

means responsive to address codes in said instruction words to develop address signals;

a memory facility for storing instruction words and data operands, said memory facility having a large capacity general storage area with a plurality of storage locations and a limited capacity special storage area with a plurality of storage locations, including a particular storage location;

means for entering information in said memory facility storage locations;

general storage accessing means, said general storage accessing means being activatable for accessing information stored in locations in said general storage area;

special storage accessing means, said special storage accessing means being activatable for accessing information stored in locations in said special storage area, including said particular storage location;

a single memory address register selectively settable to supply signals for activating said general storage accessing means to access any desired location in said general storage area in any desired random order, said single memory address register being set to activate said general storage accessing means only during accessing and transfer sub-sequences prior to an execution sub-sequence when an instruction having only one data operand address is involved;

prewired memory logical circuitry, said logical circuitry being selectively gated during accessing and transfer sub-sequences prior to execution of an instruction involving a said one data operand, as well as during instruction execution sub-sequences involving a said one data operand to supply signals for activating said special accessing means to access the locations in said special storage area, including said particular storage area, in predetermined invariable accessing sub-sequences determined by said microprogram routines;

control means operable under control of said operation code signals to selectively provide accessing and execution signal patterns related to said program sequences and microprogram routines;

first means incorporated in said control means, said first means being operable responsive to said operand address signals to set said single memory address register during an accessing sub-sequence to access said one data operand from said general storage area;

second means incorporated in said control means, said second means being operable to gate said logical circuitry prior to execution of a said instruction to thereby activate said special storage accessing means to transfer said one data operand to said particular storage area; and third means incorporated in said control means, said third means being operable during execution sub-sequences to gate only said logical circuitry, but not said memory address register, to thereby activate only said special storage accessing means to access said one data operand from said particular storage area for processing during execution of said instruction.

2. The system of claim 1 wherein the special storage area of said memory facility includes a specific instruction word location, and further comprising:

set up control means operable to access and transfer information in said system prior to execution sub-sequences in response to signals from said control means;

first set up means incorporated in said set up control means, said first set up means being operable to set said memory address register and thereby activate said general storage accessing means to access an individual instruction word from said general storage area;

second set up means incorporated in said set up control means, said second set up means being operable to gate said pre-wired memory logical circuit and thereby activate said special storage accessing means to transfer said instruction word to said specific instruction word location in said special storage area;

third set up means incorporated in said set up control means, said third set up means being operable to sense the address contained in said instruction word in order to gate said first means for setting said memory address register to access said one data operand from said general storage area; and fourth set up means operable to gate said second means to thereupon gate said pre-wired memory logical circuitry and thereby activate said special storage accessing means to transfer said one data operand to said particular storage location.

3. The system of claim 2 wherein said address codes in at least some of said instruction words are indirect, and further comprising:

conversion means in said control means operable to develop an effective address with which to set said memory address register.

4. The system of claim 2 wherein at least some of said instruction words contains an address code for said one data operand and a second address code for a second operand, and further comprising:

fourth means in said control means operable for instructional sequences involving two data operands to gate said first, second, and third means to access and transfer said one data operand to said particular storage location during operations prior to execution sub-sequences and to access said one data operand from said particular storage location during execution sub-sequences substantially in the manner set forth; and fifth means in said control means responsive to said second address code and operable to set said memory address register and thereby activate said general storage accessing means to access said second operand from said general storage area during said execution sub-sequences only when said second operand is required.

5. The system of claim 4 wherein said instruction words include addresses that are indirect, and further comprising:

conversion circuits in said control means for developing effective addresses from said indirect addresses with which to set said memory address register.